(12) United States Patent
Hellhake et al.

(10) Patent No.: US 8,341,289 B2
(45) Date of Patent: Dec. 25, 2012

(54) SYSTEM AND METHOD FOR COMMUNICATION IN A WIRELESS MOBILE AD-HOC NETWORK

(75) Inventors: Paul R. Hellhake, Downingtown, PA (US); Martin A. Lamb, Downingtown, PA (US); Joseph E. Parks, Coatesville, PA (US); Rajashekhar Mansanpally, Sunnyvale, CA (US)

(73) Assignee: Rajant Corporation, Malvern, PA (US)

( * ) Notice: Subject to any disclaimer, the term of this patent is extended or adjusted under 35 U.S.C. 154(b) by 1176 days.

(21) Appl. No.: 11/435,287

(22) Filed: May 17, 2006

(65) Prior Publication Data

US 2007/0038743 A1  Feb. 15, 2007

Related U.S. Application Data

(60) Provisional application No. 60/681,464, filed on May 17, 2005.

(51) Int. Cl.
*G06F 15/173* (2006.01)

(52) U.S. Cl. .......................................... 709/238; 709/242

(58) Field of Classification Search .......... 709/230–237, 709/238–244, 223–224, 227; 370/235–238.1, 370/395.2–395.43, 401, 464–480
See application file for complete search history.

(56) References Cited

U.S. PATENT DOCUMENTS

| | | | | |
|---|---|---|---|---|
| 6,147,965 A * | 11/2000 | Burns et al. | | 370/216 |
| 6,243,758 B1 * | 6/2001 | Okanoue | | 709/238 |
| 6,493,318 B1 * | 12/2002 | Bare | | 370/238 |
| 6,683,850 B1 * | 1/2004 | Dunning et al. | | 370/231 |
| 6,917,985 B2 | 7/2005 | Madruga et al. | | |
| 6,961,310 B2 | 11/2005 | Cain | | |
| 7,054,747 B2 | 5/2006 | Ruelke et al. | | |
| 7,167,715 B2 | 1/2007 | Stanforth | | |
| 7,263,379 B1 | 8/2007 | Parkulo et al. | | |
| 7,414,977 B2 * | 8/2008 | Orlik et al. | | 370/238 |
| 7,430,164 B2 * | 9/2008 | Bare | | 370/217 |
| 7,480,248 B2 * | 1/2009 | Duggi et al. | | 370/238 |
| 7,489,635 B2 * | 2/2009 | Evans et al. | | 370/235 |
| 2003/0058790 A1 * | 3/2003 | Nagamine | | 370/222 |
| 2003/0179707 A1 * | 9/2003 | Bare | | 370/235 |
| 2004/0156345 A1 * | 8/2004 | Steer et al. | | 370/338 |
| 2004/0243844 A1 * | 12/2004 | Adkins | | 713/201 |
| 2005/0135379 A1 * | 6/2005 | Callaway et al. | | 370/395.31 |
| 2005/0157749 A1 | 7/2005 | Lee et al. | | |
| 2005/0185606 A1 * | 8/2005 | Rayment et al. | | 370/328 |
| 2005/0237973 A1 * | 10/2005 | Takeda et al. | | 370/329 |
| 2005/0265256 A1 | 12/2005 | Delaney | | |
| 2005/0282494 A1 | 12/2005 | Kossi et al. | | |
| 2005/0286246 A1 | 12/2005 | Coon et al. | | |
| 2005/0286464 A1 | 12/2005 | Saadawi et al. | | |
| 2006/0146846 A1 * | 7/2006 | Yarvis et al. | | 370/406 |
| 2006/0291496 A1 * | 12/2006 | Zheng et al. | | 370/432 |
| 2007/0091871 A1 * | 4/2007 | Taha | | 370/352 |

(Continued)

*Primary Examiner* — Brendan Higa
(74) *Attorney, Agent, or Firm* — Blank Rome LLP

(57) ABSTRACT

A system and method for improving digital communication in a wireless mobile ad-hoc network. More specifically, the system includes one or more portable network devices operable to support the seamless operation of a self-initializing, self-healing, adaptive portable network. The portable network devices implement protocols that provide bandwidth management capabilities for use with radios, routers and other wireless network devices. Each portable network device includes at least one wireless transceiver, a processor and control software. The processor and control software are logically coupled to the wireless transceiver to facilitate digital communication via a plurality of communication channels with other network devices.

32 Claims, 28 Drawing Sheets

U.S. PATENT DOCUMENTS

| | | | |
|---|---|---|---|
| 2007/0110024 A1* | 5/2007 | Meier | 370/351 |
| 2007/0236359 A1* | 10/2007 | Wynans et al. | 340/664 |
| 2007/0280192 A1* | 12/2007 | Yagyu et al. | 370/349 |
| 2008/0151793 A1* | 6/2008 | Wright | 370/310 |
| 2008/0151841 A1* | 6/2008 | Yi et al. | 370/338 |
| 2008/0151889 A1* | 6/2008 | Yi et al. | 370/390 |

* cited by examiner

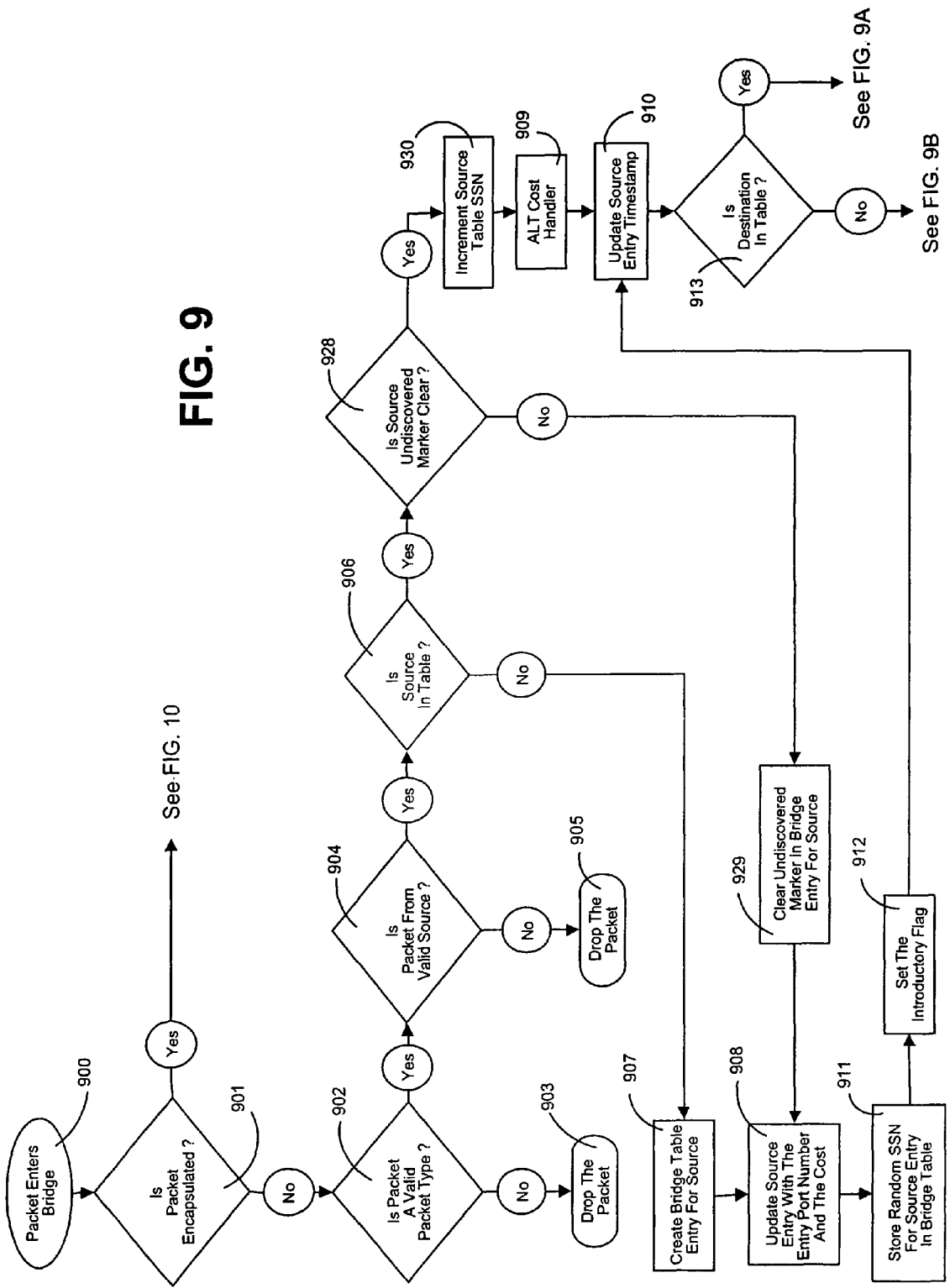

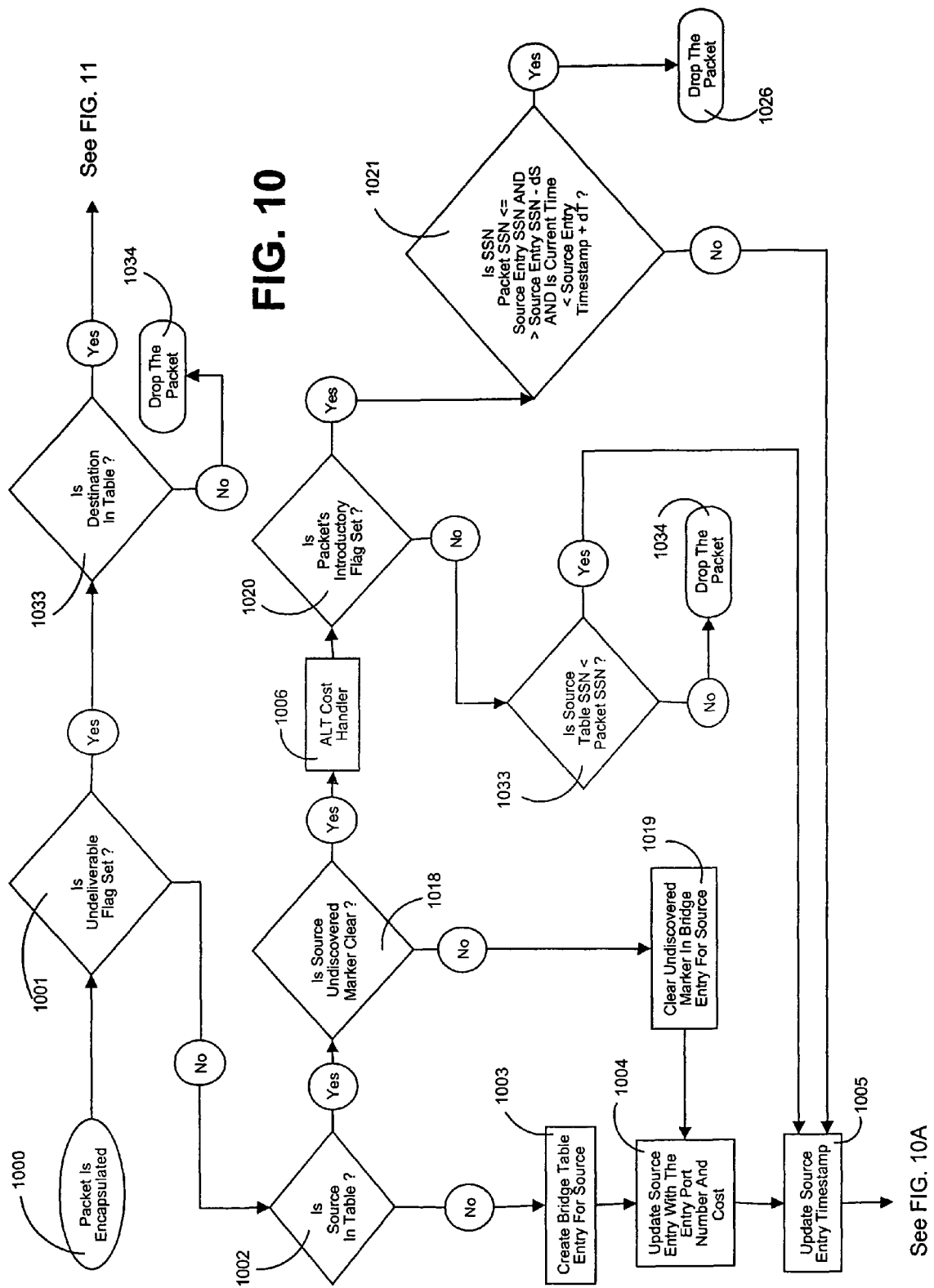

SYSTEM AND METHOD FOR COMMUNICATION IN A WIRELESS MOBILE AD-HOC NETWORK

This application claims the benefit of U.S. Provisional Patent Application Ser. No. 60/681,464 filed May 17, 2005, which is incorporated by reference herein in its entirety.

FIELD OF THE INVENTION

The present invention is directed generally to improvements in wireless communication networks. More specifically, the present invention is directed to devices and protocols that are useful, for example, in a wireless mobile ad-hoc network having dynamic topology.

BACKGROUND OF THE INVENTION

A wireless communication network typically includes a wireless client device or station (STA) that communicates with one or more access points (APs) that are connected to a communications infrastructure. The communications infrastructure typically consists of routing nodes which facilitate the movement of message packets through wired or wireless network connections. In a typical wireless infrastructure system, a STA may roam within the network by association and disassociating with multiple APs. However, typically APs and the associated network topology remain stationary and static.

FIG. 1 is a schematic diagram illustrating a conventional wireless system. The wireless network 100, in pertinent part, includes a repeater device 101 wirelessly connected via communication links 105 between two client devices 102 and an access point 104. The access point 104 is also connected through a wired network connection 107 to the LAN 106. Additionally, an administrator 103 communicates with the wireless network through the LAN 106 via the wired network connection 108. In FIG. 1, the wireless network 100 is extended using the repeater device 101. However, the repeater device 101 will effectively halve the potential bandwidth if it is sending and receiving on the same channel. Therefore, uninterrupted data streams passing both in and out of a repeater can only use, at most, half the available bandwidth on the channel.

Another type of wireless network, known as a mobile ad hoc network (MANET) enables the routing nodes to move and form a dynamic autonomous network with an arbitrary topology. In this type of wireless network, a STA may also function as a routing node and not be required to associate with an AP. A MANET is also referred to as a "multi-hop network" because multiple wireless transmission hops may be necessary to forward message packets between nodes in the network.

MANETs are attractive because they provide instant network formation without the need for connection planning and routing node administration. The result is ease of deployment, speed of deployment, and decreased dependence on a fixed infrastructure. However, a MANET must overcome numerous obstacles to effective communications. For example, nodes are mobile and connected dynamically in an arbitrary manner based on the proximity of one node to another and are therefore subject to frequent disconnection. Wireless links have significantly lower capacity than wired links because they are affected by additional error sources that result in degradation of the received signal and high bit error rates. Mobile nodes may rely on battery power and therefore be energy constrained. Mobile nodes are more autonomous and less capable of centralized administration. The mobile nodes in a network must share common radio frequencies and are therefore prone to greater interference from each neighboring node.

One important network component is its routing protocol. The routing protocol is the mechanism by which message packets are directed and transported through the network from the message source to its destination. An important routing protocol objective is to maximize network performance while minimizing the cost of the network itself in accordance with its capacity. Dynamic connections and the arbitrary manner in which nodes are connected in a MANET create a challenge to the routing method. Factors which impact the ability of the routing protocol to accomplish its objectives include hop count, delay, throughput, loss rate, stability, jitter, density, frequency of communications, and frequency of topology changes (mobility rate).

The routing protocol must also guard against message packet duplication and communication loops. For example, if two network nodes, A and B, were to retransmit every message packet they received; A would first send a message packet to B which would then retransmit it back to A, and so on. Any new message packets introduced into the network would also loop and eventually the network would be completely saturated with continuously looping message packets. Loop prevention methods such as Spanning Tree Protocol (STP), as described by IEEE 802.1 d, address this problem while allowing for path redundancy.

However, STP and its variants, such as Rapid Spanning Tree Protocol and Multiple Spanning Trees Protocol, do not perform well in networks where the quality or availability of connections between routing nodes is dynamic and subject to frequent change. For example, STP relies upon a root node to organize and create a logical tree that spans all of the nodes in the network with only one active path. This routing pathway information is disseminated from the root node to all other routing nodes. Any changes to the network topology, including changes in link quality and the addition or subtraction of a pathway or network node must be organized by the root node and a new logical tree created and disseminated to all routing nodes. Because of this, STP and other protocols which rely upon root node techniques do not perform well in dynamic network environments and can cause network reliability issues due to unacceptable periods of interrupted communications while the network routing is rediscovered and disseminated to all routing nodes.

In order for a routing node to forward a message packet, the routing protocol must know the network address of the next network node in the message packet's path. Network addresses can either be explicitly stated in the header or wrapper of the message packet, or predetermined and maintained in a table by each routing node. In the former, called source routing, there is no need to maintain a table at every routing node because every packet contains the address of every network node the packet needs to traverse. In the latter, called table-driven routing, the next routing node address is taken from a table based on the packet destination address and other criteria defined by a routing protocol. In table-driven routing, such as Optimized Link State Protocol (OLSR) and Wireless Routing Protocol (WRP), each routing node must continuously evaluate and maintain information on routes to every other node in the network and periodically exchange this information with other routing nodes.

Some MANET routing protocols include variations for on-demand routing using reactive mechanisms, where routes are found when they are needed and thus reduce the amount of overhead traffic by avoiding the need to frequently exchange state information. Additionally, there are other hybrid, hierarchical, and location-based protocols that have been proposed. Two of the better known MANET protocols are Ad hoc On-Demand Distance Vector Routing (AODV) and Dynamic Source routing (DSR). AODV is based on a distance vector routing method and uses a route table to find the next network node in the route. However, the AODV protocol assumes that each link is symmetric and is not well adapted to networks having asymmetric pathways between routing nodes. DSR is based on a source routing method and while supporting asymmetric pathways between routing nodes, it imposes the overhead of communicating the entire route map with every message packet.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In some embodiments, it is an object of the present invention to develop a MANET Node Device, network routing protocols and administrative systems that support rapid and robust adaptation to the factors impacting the efficient propagation of message packets through a mobile wireless network. There is also a need for a MANET Node Device that readily supports the interconnection between the MANET network and other networks. There is also a need for a MANET Node Device that minimizes the need for skilled installation and administration of the network by implementing protocols, techniques, mechanisms, and processes to self-initialize and auto-configure the network for optimized network reliability and availability, channel analysis and selection, security and other network services. There is also a need for a MANET Node Device that can select and use multiple radio transceiver channels while minimizing the impact of interference on message packet throughput. There is a further need to integrate these protocols, techniques, mechanisms, and processes in a way that the MANET Node Devices are portable and usable in harsh physical environments and situations.

According to these and other objectives, and to overcome limitations of the prior systems and other limitations that will be apparent upon reading and understanding the present application, the present invention is directed to a system and method for reliable data communication in a wireless network, especially when the routing nodes are mobile and the connections can be dynamic and arbitrary.

The preferred embodiment of the present invention includes a MANET Node Device having a power-efficient computing platform, enabling it to function under portable battery power. The MANET Node Device is also equipped with at least one radio transceiver providing Physical layer (Layer 1) and Data Link layer (Layer 2) services for establishing a Mobile Infrastructure Peer (MIP) communications link with neighboring MANET Node Devices. For example, a radio transceiver which supports IEEE approved or proposed standards 802.11a, 802.11b, 802.11g, 802.11n, 802.16a, 802.16e or 802.20. The MANET Node Device can also provide AP services to STAs on at least one radio transceiver. The computing platform, radios and related electronics are encased in housing which reduces the egress and ingress of radio frequency interference (RFI) and mitigates the buildup of internal heat.

The present invention includes a message packet routing protocol implemented at OSI Layer 2. The protocol uses a hybrid path discovery technique comprised of both proactive and reactive path discovery methods and thus enables fast failover to alternate pathways while adding minimal protocol overhead. For example, the proactive path discovery techniques of the message routing protocol include causing an introductory message to be generated by a MANET Node Device when a STA associates with an AP, as well as the reading, analysis and storage of reverse route information. Reactive path discovery techniques include a discovery request message that is sent by a MANET Node Device when a local table entry exists for the message destination. The MANET routing protocol also includes path cost calculations which encourage a preference for higher bandwidth connections, while emphasizing communications reliability. The MANET routing protocol also includes Layer 2 flood control mechanisms for mitigating flood attacks and reducing the bandwidth impact of certain legitimate flood messages such as the MANET routing protocol discovery request messages and address resolution protocol (arp) requests used by Internet Protocol version 4 (IPv4).

More specifically, the preferred embodiment of the present invention is directed to a method for implementing a MANET, Layer 2 message packet routing protocol for handling data communication in a MANET Node Device. The routing protocol includes detecting at least one data packet entering a port on the MANET Node Device and reading the associated message packet header information. The information in the header is then compared with information contained in a table stored and maintained locally by the MANET Node Device. By way of example, the local table includes information related to at least destination address, source address, port, path cost, timestamp, source sequence number (SSN), and alternate port and path cost for the MIP port connections available on the network. Based on the comparison, a data packet can be either dropped or prepared for transmission via a port connection on the MANET node.

The MANET routing protocol adds its own header to data packets being prepared for transmission via a MIP port connection. The protocol header is comprised of information related to the destination address, source address, source sequence number (SSN), protocol identifier information, path cost, Ethertype, time-to-live and protocol flags. At least some of the current information in an existing local table is updated based on the examination of the protocol header on a data packet received over a MIP connection from another MANET Node Device.

The preferred embodiment of the system also provides multifunctional usage of radio transceivers in which each radio transceiver can provide both AP services for communicating with STAs and MIP connection services for node to node routing of message packets. More specifically, a two radio transceiver MANET Node Device operates on two different channels, and each channel can provide AP services and MIP routing services. A routing protocol management application on the MANET Node Device prevents MIP connections from occurring between radio transceivers on the same MANET Node Device while still allowing message packets arriving on one radio transceiver to be forwarded out of the other transceiver, if the routing protocol's costing algorithm indicates.

Automated management and startup processes are provided in which network and radio transceiver settings within the MANET Node Device are automatically configured. For example, wireless channel selection is automated through the startup process to accomplish the primary goal of choosing a radio transceiver channel with the strongest connection to a neighboring MANET Node Device, and the secondary goal of choosing the least noisy channel in order to reduce over use of frequencies. The MANET Node Device's channel selection process for each radio transceiver uses at least the criteria of signal strength, noise strength and the detection of other MANET Node Devices on each channel to automatically select operating channels. Another specific example of the automated startup process is the detection of a Dynamic Host Configuration Protocol (DHCP) server on an external network interface of the MANET Node Device and the automatic configuration of a Network Address Translation (NAT) router process on the MANET Node Device to enable network to network communications.

The system also implements automatic channel selection when a plurality of channels are available for use by the MANET Node Device. The channel selection includes starting up each MANET Node Device and scanning the network channels to determine the signal/noise ratio (SNR) and signal levels for each available channel, along with the existence of other MANET Node Devices within radio transceiver range. The radio transceivers in each MANET Node Device are assigned channels based on the results of the scanning process. At least one radio transceiver is configured for communications with other MANET Node Devices on the network and at least one radio transceiver can also be configured for AP communications with wireless STAs seeking access to the network. The radio transceiver channel assignments on the MANET Node Device can be automatically reconfigured based on changes in network operating conditions or manually configured by a network operator through an administrative process.

In some embodiments, the system also connects the MANET Node Device network to other wireless and wired networks and enabling the exchange of message packets between the networks. The MANET Node Device is equipped with at least one Ethernet interface or at least a second radio transceiver that is configured to establish a bridge, router or NAT router connection to another network. For example, an Ethernet interface or a second radio transceiver on the MANET Node Device can be automatically or administratively configured to establish a bridge connection to another network through a wired or wireless connection. The MANET Node Device listens to all message traffic on both networks, and forwards each message packet to the network that is not the one from which the message packet was heard. The MANET Node Device maintains a table of station network locations, derived from the content of the message packets being forwarded. The MANET Node Device associates stations with a particular network connection, and can then forward message packets in a more efficient manner, transmitting only over the appropriate connection. The MANET Node Device will also recognize a message packet that does not need to be forwarded.

Alternatively, the MANET Node Device can be automatically or administratively configured to route message packets between the MANET Node Device network and another network through an Ethernet interface or one or more radio transceivers. For example, a radio transceiver in the MANET Node Device can be administratively configured to establish either a peer-to-peer connection to a wireless ad hoc network or a STA connection to an AP on another wireless network. This connection can be configured to provide routing and networking functions such as Network Address Translation (NAT), static ingress port forwarding, and static egress port forwarding to enable the forwarding of message packets from one network to another. Routing connections can be configured between a MANET Node Device network and a plurality of external networks. Additionally, a plurality of MANET Node Devices can route message packets between a MANET Node Device network and a single external network.

Ingress Port Forwarding enables a MANET Node Device to route message packets from one external network connection to another external network connection through the MANET Node Device network. For example, a MANET Node Device can be administratively configured to direct message packet traffic entering the MANET Node Device network from an external network connection through the MANET Node Device network to another MANET Node Device where the message packet traffic exits to another external network.

Some embodiments provide a Dynamic Host Configuration Protocol (DHCP) server on the MANET Node Device with a unique pool of IPv4 addresses to prevent the same address from being provided to a plurality of stations on the network. For example, although the MANET Node Device uses Internet Protocol version 6 (IPv6) addresses internally for communications with remote administrative and management applications, a unique pool of addresses are calculated using an algorithm based on the unique MAC of the MANET Node Device's radio transceiver interface. The DHCP server uses this address pool to respond to IPv4 DHCP address requests from STAs on the network.

An administration system connects the MANET Node Devices with a software application that presents information to the administrative user about the current status of connections, security and performance of the MANET Node Device network and provides the administrative user with a means to affect changes to the current status. More specifically, the administration system provides a graphical and tabular representation of the current topology of the wireless network, including objects representing each MANET Node Device, each associated station, and each MIP and AP connection. Additional status details are available to the administrative user that identify the specific channels used by a connection, signal and noise measurements, network address assignments, operational time, software versions, port configurations, access control settings, intrusion detection settings and state, among others. The graphical user interface provides access to this information through a combination of graphical representation, window tabs, pull-down menus and mouse over popups. The administrative user may affect changes to current settings and default configurations, override automatic settings, initiate built in testing, rearrange graphical display elements, manage security parameters, and other network administration functions.

An onboard testing and evaluation mechanism provides operator feedback regarding the functionality of hardware and software as well as the current status of wireless MIP connections to neighboring MANET Node Devices. More specifically, the testing and evaluation mechanism consists of a display, for example a multicolor Light Emitting Diode (LED); a user interface, for example a switch to provide power to the LED; and control software. The testing and evaluation mechanism provides operator feedback on the status of the operational MANET Node Device and its MIP connections to other MANET Node Devices through a combination of LED color and blinking. For example, the BITE LED will emit a continuous blue light if the MANET Node Device is functioning, but has not established a MIP connection with another MANET Node Device. Alternatively, the testing and evaluation LED will emit a blinking green light if the MANET Node Device is functioning and has established one or more MIP connections with neighboring MANET Node Devices, but none of those connections are of the highest connection bandwidth supported by the transceiver. As further example, the LED will emit a continuous red light if an error state occurs and the LED will emit a blinking red light during a user initiated software update.

A bi-directional frequency translator (transverter) down-converts and upconverts MANET Node Device radio transceiver signals to RF bands other than those provided by the radio transceiver. The transverter interacts with the signal from the transceiver to either convert the transceiver transmit signal up to a higher frequency and convert the receive frequency down to the transceiver receive frequency, or convert the transceiver transmit signal down to a lower frequency and convert the receive frequency up to the transceiver receive frequency. The transverter, coupled with a low-noise amplifier appropriate for the frequencies being converted up or down to, provides a means to operate the MANET Node Device in frequencies with certain desirable characteristics, such as better propagation through obstacles.

A path cost algorithm encourages a preference for higher bandwidth connections, though it does not guarantee the connection with the maximum throughput.

A single board computer design based on a low-power processor allows the MANET Node Device to run on batteries. Antenna type and its physical location on or in the MANET Node Device are selected to improve throughput by reducing co-channel interference. The amplifiers increase the functional distance between MANET Node Devices by increasing transmit and receive signal gain. The amplifiers incorporate fast acting pads to overcome susceptibility for overdriving the receiver. An integrated signal filter system improves the problem of co-channel interference and a composite canceller is used to further reduce the interference. A tricolor LED and control software provides user feedback on the status of the node device and its connection to the mesh. A down converter or up converter package enables the radios to operate in lower or higher frequencies with better propagation or lower interference characteristics.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIGS. 9, 9A, 9B and 9C together comprise a flow chart illustrating a data packet handling technique in accordance with an exemplary embodiment of the present invention;

FIGS. 10 and 10A together comprise a further flow chart illustrating data packet handling techniques in accordance with an exemplary embodiment of the present invention;

DETAILED DESCRIPTION OF THE PREFERRED EMBODIMENTS

Figure 1:
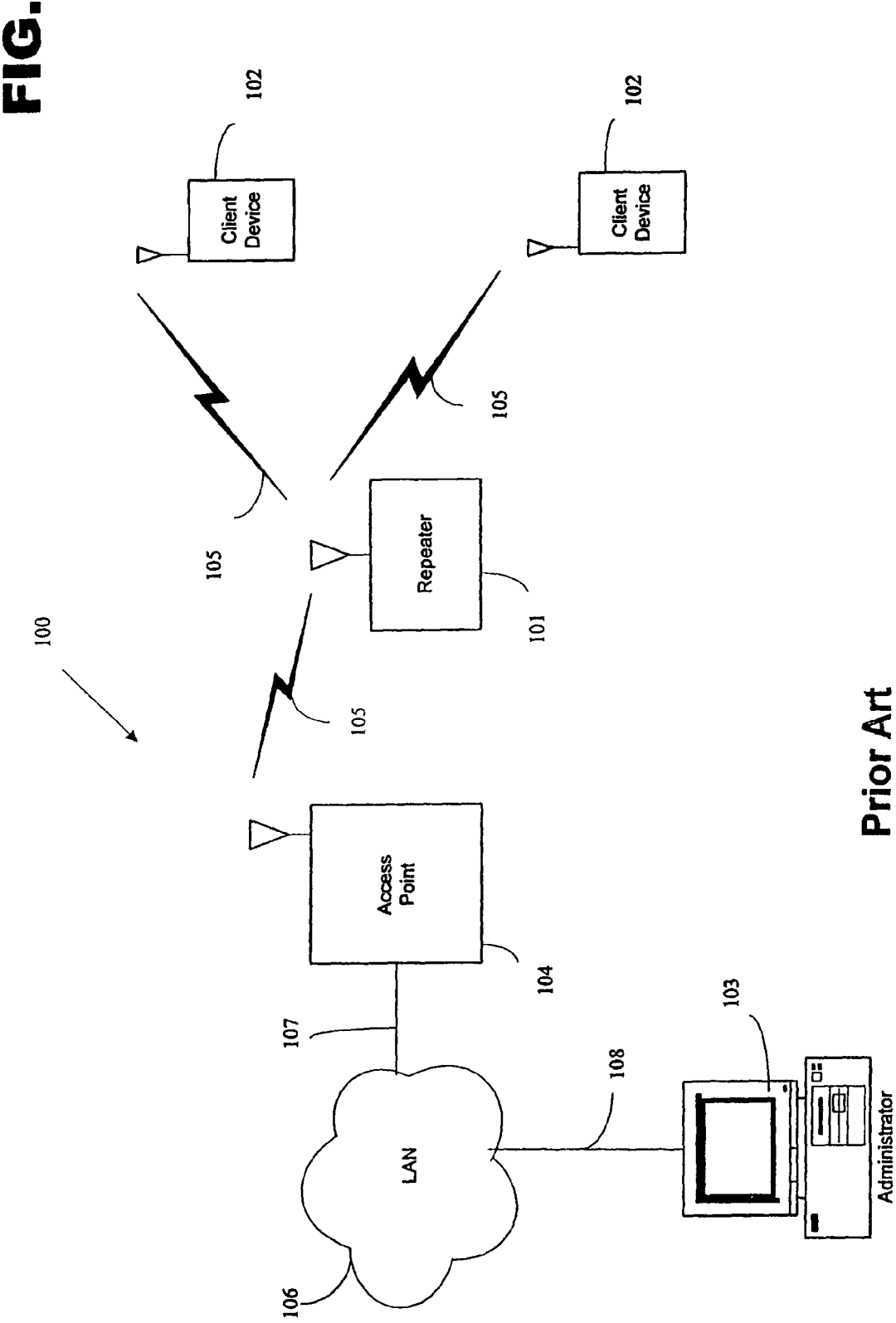
FIG. 1 is a schematic diagram illustrating a prior art wireless system.

The present invention will be described in terms of one or more examples, with reference to the accompanying drawings. In the drawings, some like reference numbers indicate identical or functionally similar elements. Additionally, the left-most digit(s) of most reference numbers may identify the drawing in which the reference numbers first appear.

The present invention will be explained in terms of exemplary embodiments. This specification discloses one or more embodiments that incorporate the features of this invention. The disclosure herein will provide examples of embodiments, including examples of data analysis from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may effect such feature, structure, or characteristic in connection with other embodiments whether or not explicitly described.

Embodiments of the invention may be implemented in hardware, firmware, software, or any combination thereof, or may be implemented without automated computing equipment. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in PDAs, mobile telephones, and other portable devices; magnetic disk storage media; optical storage media; flash memory devices; electrical, optical, acoustical, or other forms of propagated signals (e.g. carrier waves, infrared signals, digital signals, analog signals, etc.), and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Figure 2:
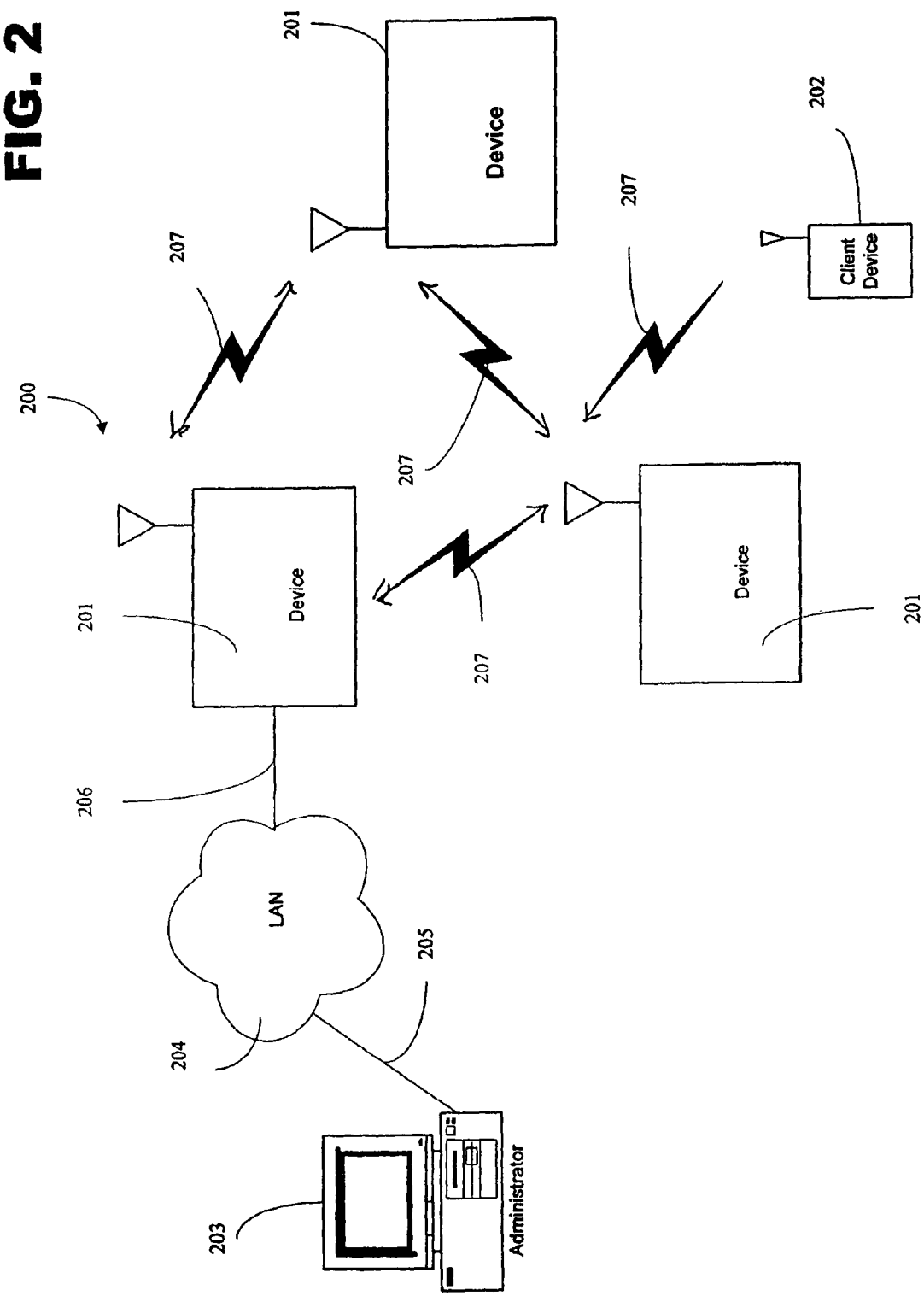
FIG. 2 is a schematic diagram illustrating a system for a wireless mobile ad-hoc network in accordance with an embodiment of the present application.

FIG. 2 is schematic diagram illustrating a wireless mobile ad-hoc network 200. In accordance with one example of a preferred embodiment, the wireless network 200 includes several wireless network node devices 201 communicating wirelessly over a communication link 207. Each communication link 207 utilized by the node device 201 includes at least one channel that conforms to the IEEE 802.11b, 802.11a, 802.11g or other standard as a forward and backward link for communicating with other node devices 201 in the network 200. Each node device 201 includes at least one transceiver, a processor module, a memory module and control software logically connected to select and configure at least one transceiver for establishing and maintaining a communications link with other devices on the network 200 by scanning and selecting a channel from a pool of available channels. A more detailed description of the node device 201 is provided in the discussion of FIG. 4.

The network preferably provides a mesh architecture with a protocol that transparently recovers from node failures, jamming, and traffic congestion. The network preferably does not rely on base stations, root nodes or any central routing control authority, and therefore does not require constant communication with any given network component for proper operation.

Figure 3:
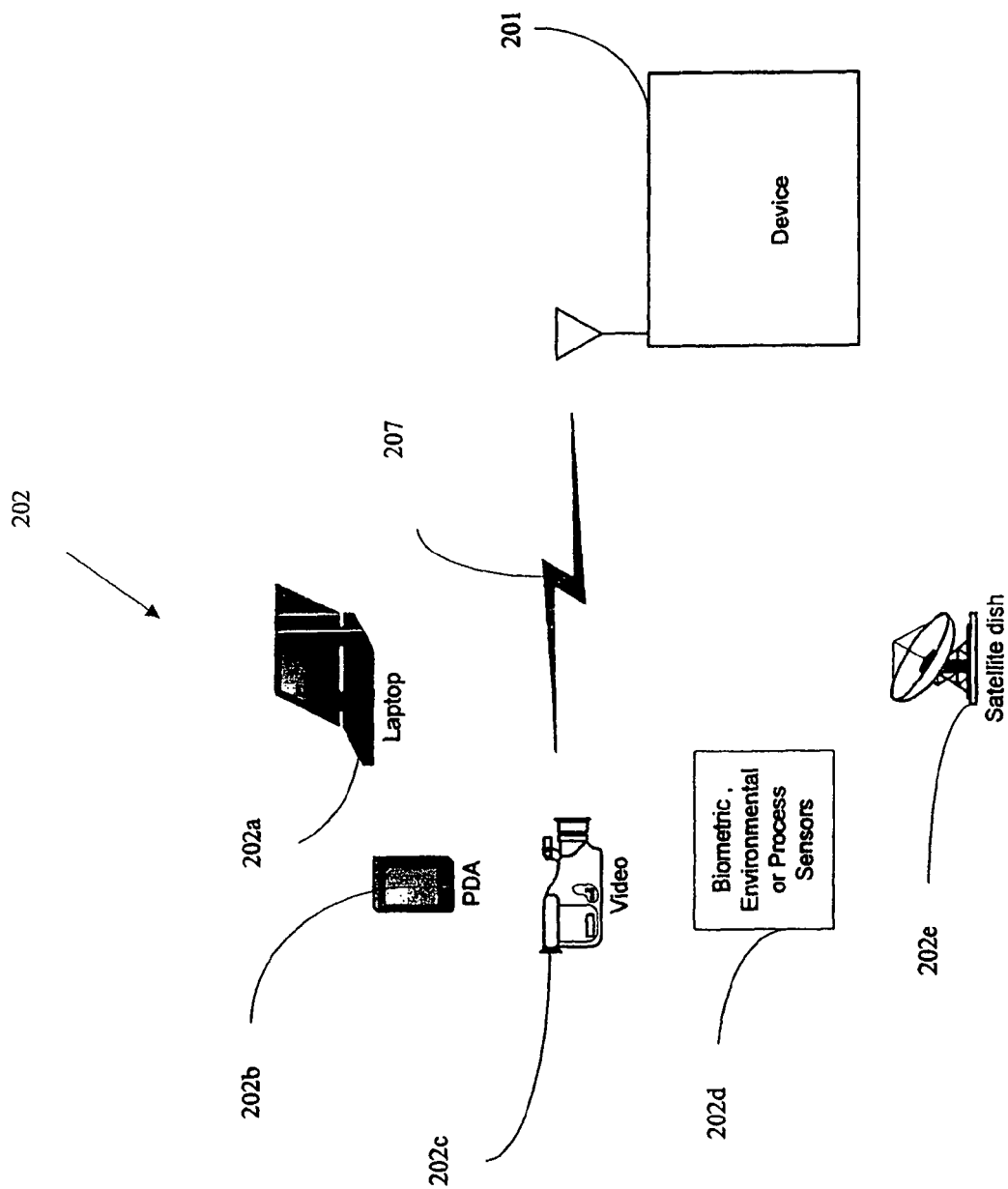
FIG. 3 is a schematic diagram illustrating an example of client devices communicating with a network node device in accordance with an embodiment of the present invention.

At least one of the channels in the communication link 207 used by a node device 201 may be configured for communication with a client device 202. FIG. 3 illustrates the types of client devices 202 that can communicate with the node device 201. In FIG. 2, at least one node device 201 is configured as a gateway or bridge to the wired network 204 via a wired network connection 206. To that end, each node device 201 can operate as an access point for client devices, a wired bridge to client devices, a wireless bridge to other node devices, a wired bridge to an Ethernet network, a gateway to other wireless networks, and a gateway to a wired Ethernet network.

The administrator 203 can communicate with the wireless network 200 via the LAN 204 and wired connection 205. The administrator can be a PC or the like that is capable of graphically illustrating a topology of the wireless network 200 as well as monitoring and controlling network devices. However, the administrator 203 is not limited to use with a wired connection 205, and is adaptable to communicate with the network 200 via a wireless connection that is compatible with the transceiver standards of the node device 201.

In an embodiment, a mesh architecture permits automatic recovery from node failures, jamming, and traffic congestion. Because it does not rely on base stations, root nodes or any central routing control authority, the architecture does not rely on constant communication with any given network component. Operational and performance features of the network are mission configurable, but these settings are non-volatile and can be preconfigured. Tactical security features may also be provided in the network, such as support for NSA Type-1 certified Harris SecNet 11 radio cards, FIPS 140-2 certified encryption for administrative and Ethernet device communications, and compatibility with third-party encryption, authentication and intrusion detection systems. In an embodiment, proprietary amplification and filtering circuitry provides extended line-of-sight range at bandwidths of up to 11 Mbits per second, using radios conforming to the IEEE 802.11b standard. Preferably, per-hop latency is low. In further embodiments that will be described herein, configurable services include DHCP, NAT, port forwarding, Egress mode, Ingress mode and bridging.

FIG. 3 is a schematic diagram showing several examples of the types of client devices that may communicate with a node device in accordance with an embodiment of the present invention. In FIG. 3, a node device 201 is communicating with several client devices 202 via a wireless communication link 207. As stated previously, each communication link 207 may include at least one channel assigned to communicate with a client device 202. By way of example, the client devices 202 may include a laptop computer 202a, a personal digital assistant (PDA) 202b, a video recorder 202c, sensors 202d or an IP phone 202e. The sensors 202d may include a biometric sensor, an environmental sensor, a process sensor or the like that are worn by an individual or placed in a location to be monitored. The client devices 202 may be connected to a node device 201 via a wired network connection 206, thus providing the wireless network 200 access to the client device without the client device being compatible with the node device 201.

Additionally, the node device 201 can be specifically configured to connect the network 200 to other communication networks via a serial, PCMCIA, cardBus, mini-PCI, Ethernet or other hardware interfaces. Example of these communication networks include a satellite network, cellular network, a dial-up modem network or the like. However, the services available via a node device 201 are determined by the software and the equipment (i.e., radio transceiver, Ethernet port, etc.) used in the device 201.

Figure 4:
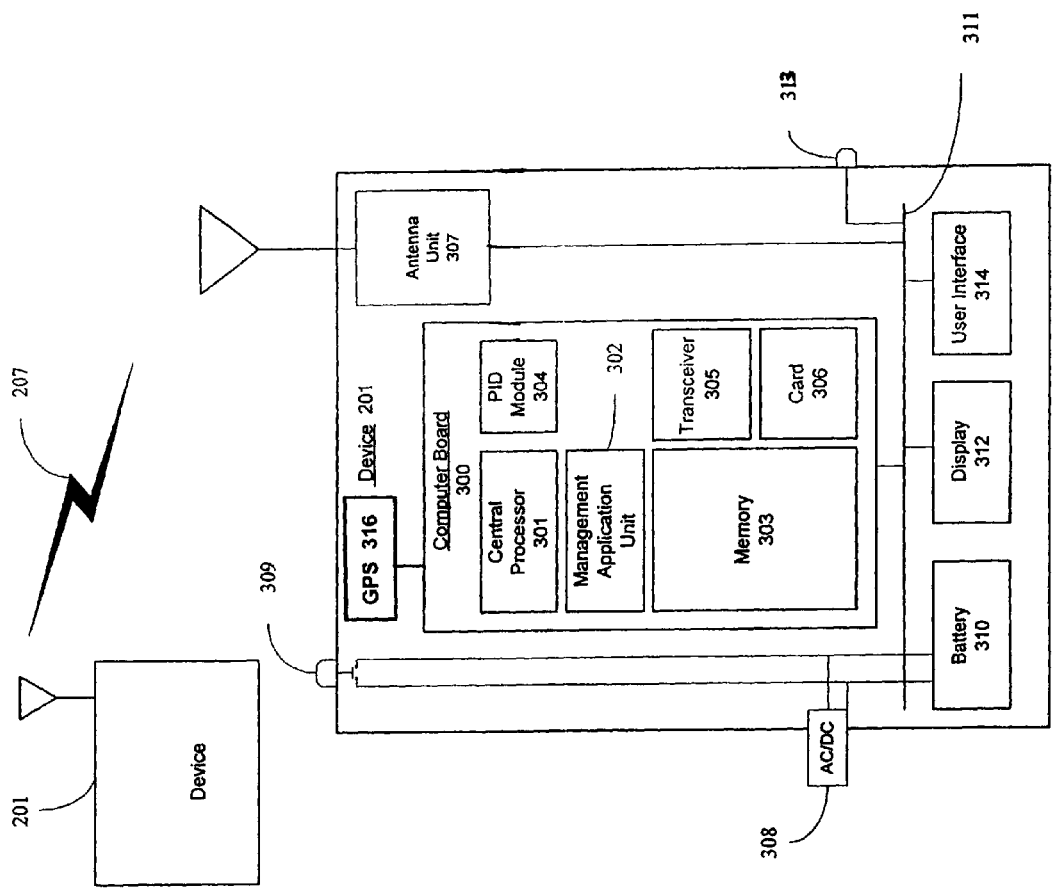
FIG. 4 is a schematic diagram illustrating in more detail a network node device in accordance with an embodiment of the present invention.

FIG. 4 is a schematic diagram that provides a more detailed illustration of an exemplary embodiment of a node device 201 in accordance with one embodiment of the present invention. In the embodiment of FIG. 4, node device 201 includes a central processor 301, at least one transceiver 305, at least one other electronic communication card 306, a memory 303, a control software module 302, a power supply 310, a display 312 and a user interface 314. The central processor 301 controls the operations performed by the node device 201, which includes the execution of the management applications in the control software module 302. The different management applications in the control software module 302 will be described in the discussion of FIG. 5. The central processor 301 is logically connected to the transceiver 306 for achieving data communication on at least one of three non-overlapping channels in the communication link 207 between the node device 201 and other devices in the network 200.

In some embodiments, a location indicating device may also be installed. The location indicating device may be, for example, a satellite position determining system such as a Global Positioning System (GPS) or Galileo device, a gyroscopic device, a radio-based locating system, or any other position determining system. In the embodiment shown in FIG. 4, a GPS 316 is provided. The location information provided by GPS 316 may be selectively reported to a remote software application by the device 201 using a secure administration protocol. The location information thus provided is useful in retrieving and servicing devices 201 that have been placed in remote locations to form a network.

The devices 201 may use any single channel or combination of available channels. In one preferred embodiment the devices use fixed channels 1, 8 & 11 as defined in the IEEE 802.11b standard. Eleven channels are authorized in the US for IEEE 802.11b, of which channels 1, 6 and 11 are considered to be non-overlapping. In addition, each of these main signals have side lobes. The channel 6 side lobes extend into the main signals for channels 1 and 11, and, vise versa. Applicants have determined that the best throughput for a 3 channel combination is 1, 4 & 11 or 1, 8 & 11, which is most likely due to the location of troughs between lobes.

Fixed channels might be set if known interference is on channel 1, 8 or 11, but it is not constant and therefore automatic scanning may miss it. Also, filters are used on one or more devices to achieve greater isolation between radios within the same device, but these filters typically require the radio to operate on a specific channel. It is often desirable for other devices which need to mesh with filtered devices to be fixed to the same channels in order to insure dual radio mesh connections which result in greater bandwidth between devices. In addition, the use of fixed channels prevents the mesh from being broken, such as when a single radio device is used and that device and at least one radio in nearby devices is not fixed to the same channel.

The electronic communication card 306 can be a second transceiver or an Ethernet card that is used for bridging or routing between the node 201 device and any IP-based network, or between a wireless network and a wired network. The transceiver 305 and the electronic communication card 306 are coupled to the antenna unit 307 for communication with other devices in the network 200 via the communication link 207. The antenna unit 307 includes at least a radio transceiver to facilitate wireless communication.

The memory 303 provides storage for data that is sent to and received from devices in the network 200. Power is supplied to the node device 201 by a rechargeable (including solar) or one-time-use battery 310. In the alternative, power can also be provided by an AC power source via the AC adapter 308 on the node device 201. The display 312 and the user interface 314 provide for communication between a user and the node device 201. The display 312 can be an LCD display, an LED or the like, and the user interface 314 can be a keypad, a touch pad, switches and dials or the like. The node device 201 includes the use of a position-indication module 304 that is controlled by the central processor 301 for determining the position of the node device 201 and sending a signal to the network regarding its position. For example, the position-identifying module 304 can comprise at least a global positioning satellite receiver or an inertial guidance module (not shown). A locator beacon 313 is also provided for signaling the position of the device 201. The locator beacon 313 can provide visual as well as audible position indication. Locator beacon 313 may be actuated by a wireless signal from another device in the network, such as another device 201 or an administrative station. The electrical connections between the components in the node device 201 are provided through a common electrical bus 311.

Figure 5:
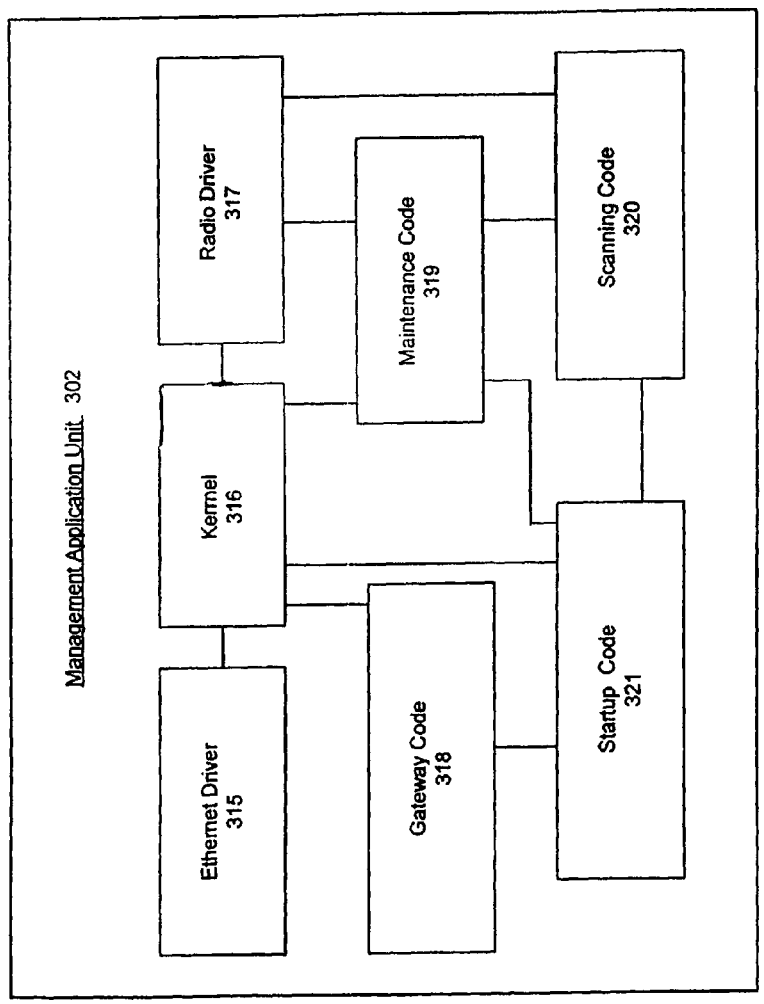
FIG. 5 is a schematic diagram illustrating in more detail the control software module of a network node device in accordance with an embodiment of the present invention.

FIG. 5 is a schematic diagram that provides a more detailed illustration of the control software module in a node device in accordance with an embodiment of the present invention. In FIG. 5, the control software module 302 includes at least an Ethernet driver 315, kernel and mesh code 316, radio driver 317, gateway code 318, maintenance code 319, startup code 321 and scanning code 320.

The Ethernet driver 315 is used to establish and maintain the Ethernet connection with a wired network when the node device 201 includes Ethernet hardware. The kernel and mesh code 316 performs bridging and routing operations in the network 200 as well as performs NAT operations when Ethernet hardware is present in the node device 201. The radio driver 317 is used to establish and maintain a MIP connection when communicating with the network 200.

The startup code 321 is used to configure the kernel and mesh code 316 and radio driver 317 upon startup of the node device 201. The startup code 321 also launches the gateway code 318, scanning code 320 and maintenance code 319. The gateway code 318 determines whether to add a device to the network bridge or activate IP NAT based on the observed capabilities of the network. The gateway code 318 also is used for maintaining a Dynamic Host Configuration Protocol (DHCP) server for storing and maintaining IP addresses. Therefore, if Ethernet hardware is detected in a node device 201, the NAT gateway is automatically configured to launch a DHCP for contacting any available DHCP server for obtaining IP addresses. In the alternative, the Ethernet hardware can also be added to a network interface for extending the wireless network across a wired network.

The scanning code 320 is used for reporting channel activity to the maintenance code 319, and the maintenance code 319 is used to actively decide whether to accept a MIP connection. The maintenance code 319 determines which channels are to be used based on the information provided by the scanning code 320 and radio driver 317. Further details relating to exemplary embodiments of these management applications will now be provided with reference to FIGS. 6-8.

Figure 6:
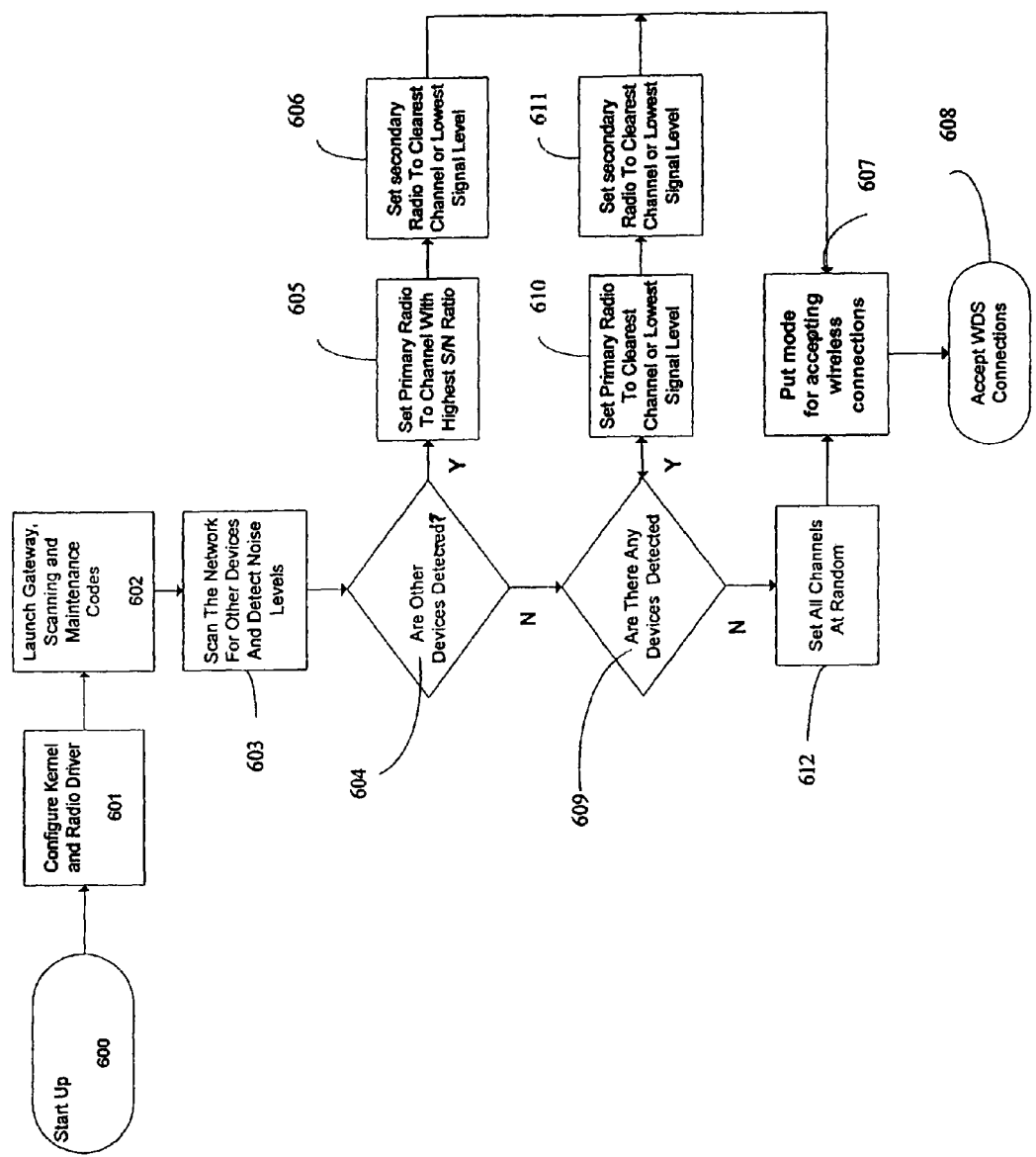
FIG. 6 is a flow chart illustrating a channel selection technique in accordance with the preferred embodiment of the present invention.
Figure 7:
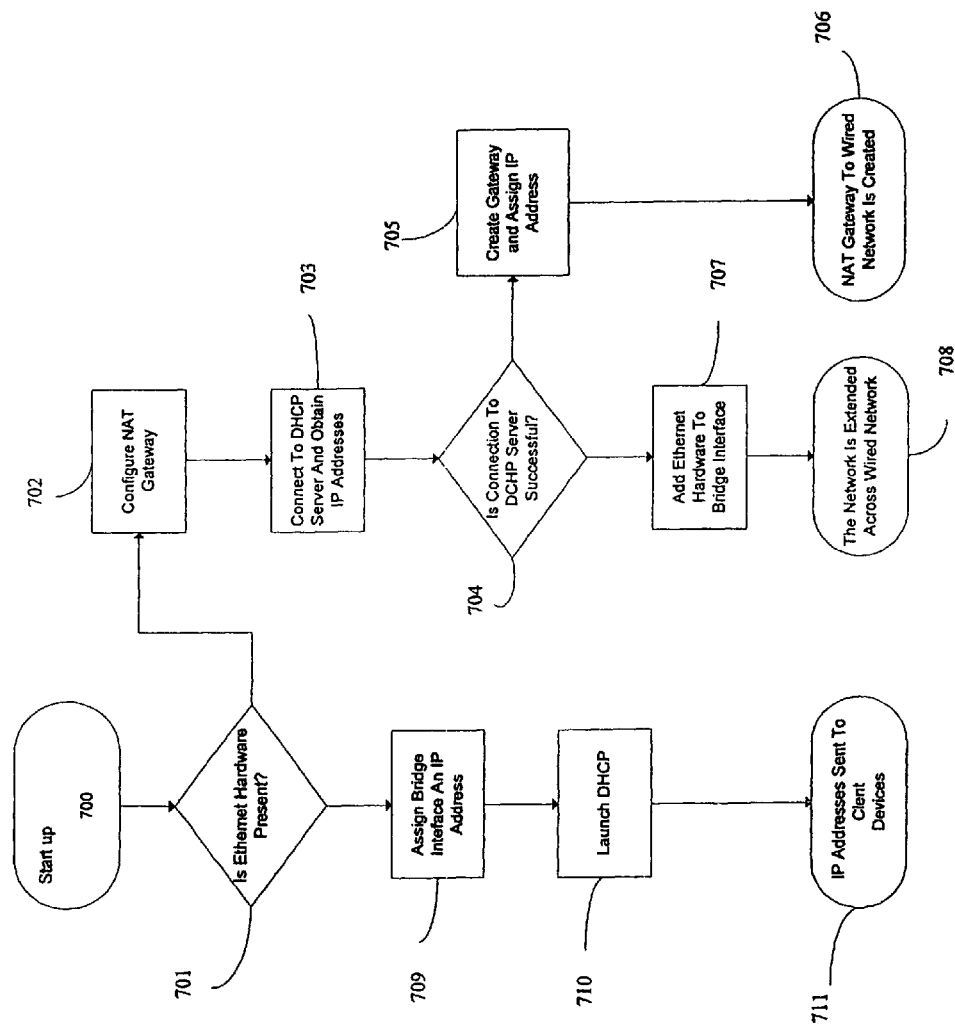
FIG. 7 is a flow chart illustrating a channel selection technique in accordance with the preferred embodiment of the present invention.
Figure 8:
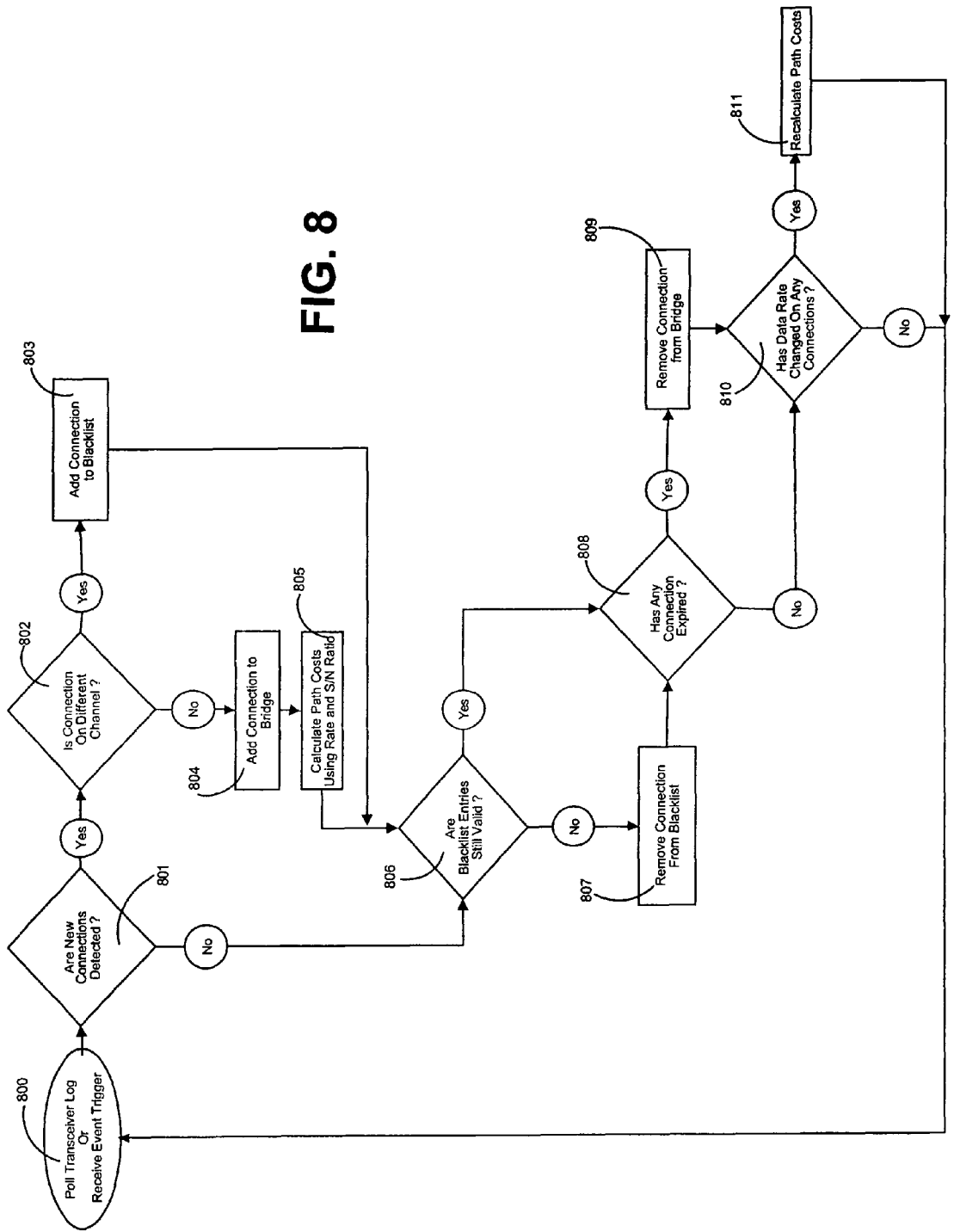
FIG. 8 is flow chart illustrating a channel selection technique in accordance with an exemplary embodiment of the present invention.

FIGS. 6-8 are flow charts illustrating one embodiment, provided as an example implementation of the invention. This embodiment demonstrates a selection among available channels using the node device. In FIG. 6, the node device 201 is first started in step 600. In step 601, upon startup, the kernel and mesh code 316 and radio driver 317 are configured. In step 602, the gateway code 318, the maintenance code 319, the startup code 321, and the scanning code 320 are launched. Next, in step 603, the scanning code 320 scans the network 200 for other devices and detects noise levels on at least three non-overlapping channels. In step 604, the node device 201 determines if any other node devices 201 are detected on the network 200. If other node devices 201 are detected, then in step 605 the primary transceiver is set to that channel (i.e., the channel with the highest S/N ratio. Thus, for instance, if two channels from a pool of three channels are found to have other devices within range, then the one with the highest signal to noise ratio is selected. This is done to maintain the mesh.

The system determines what channels any node device 201 may be on, and then selects the "best" channel from among those channels. The best channel is based on the S/N ratio, which means that it has a fairly strong connection to that peer while avoiding a channel that is being used by a significant number of both other node devices 201 and client devices (noise). Additionally, in step 606, the secondary transceiver is set to the clearest radio channel or the lowest signal level. The radio measures signal and noise levels. Signal is what the radio recognizes as communications. The signal and noise measurements are typically measured in decibel milliwatts and the signal-to-noise ratio (SNR) is in plain decibels, which is useful for comparing one value to another. In the case of the signal and noise measurements, 1 mW can be selected to be 0 dB and measurements can be determined from there (hence, these measurements are usually a negative number). In the case of the SNR, two values are directly compared and it doesn't matter what value is used as a zero for each measurement as long as it was the same. The difference gets lost in the subtraction. For example: Signal=−38 dBm=1 mW−38 dB; Noise=−96 dBm=1 mW−96 dB; SNR=38 dBm−−96 dBm=(1 mW−38 dB)−(1 mW−96 dB)=(1 mW−1 mW)+(96 dB−38 dB)=58 dB.

The clearest channel is the channel which the radio reports as the lowest signal level. In step 607, the node device 201 is placed in a mode to accept wireless connections and in step 608 wireless connections from the network 200 are accepted.

However, if no other node device 201 is detected on the network 200 at step 604, then in step 609 it is determined if any competing devices are present on the network 200. A competing device may be a source for noise, such as other devices using RF communications in the same frequencies like some cordless phones, and devices which give off RF transmissions as a byproduct of their intended purpose like microwave ovens. These competing devices increase the noise number in the S/N equation. Competing devices are those that create noise. The radio categorizes the signal (transmissions that the radio recognizes as communications) and noise (everything else). If other competing devices are present on the network 200, then the primary transceiver is set to the clearest (i.e., least noisy) channel in step 610. The secondary transceiver is then set to the next clearest channel remaining in step 611. However, if it is determined that no other competing devices are present on the network 200 (i.e., that no additional noise was found on any channels being analyzed so that all of the channels have the same amount of noise), then all the channels are set at random in step 612 using available channel pairs (for example, 1 and 11, 8 and 1, and 11 and 8). In any case, the node device 201 is eventually set to a mode for accepting wireless connections and then accepts the connections from the network as in steps 607-608.

As stated previously, at least one channel of the transceivers is set to AP mode and accept a connection from a client device 202. The transceivers are enslaved by a bridge interface, which allows the devices to intercommunicate. If there are two transceivers in the node device 201, each transceiver is placed on a different channel. Additionally, each node device 201 in the network will always share at least one common channel of at least three non-overlapping channels. If Ethernet equipment is present in the node device 201, channel selection for the second channel is slightly different, FIG. 7.

FIG. 7 is a flow chart illustrating the channel selection technique when Ethernet hardware is installed in a node device in place of a second transceiver. In step 700, a node device 201 is started. When the node device 201 starts, the control software module 302 automatically determines the type of hardware present in the node device 201 in step 701. If it is determined that Ethernet hardware is present, then in step 702 the gateway code 318 automatically configures a NAT gateway. The Ethernet hardware is typically installed instead of a second transceiver. In step 703, the NAT gateway configuration automatically launches a DHCP client daemon. The daemon attempts a connection with any available DHCP server to obtain an IP address. It is determined if the connection to a DHCP server is successful in step 704. If the connection with a DHCP server is successful, then in step 705 the NAT gateway is assigned an IP address. In step 706, the NAT gateway to a wired network is created.

However, in step 707, if the connection to a DHCP server is unsuccessful, then the Ethernet hardware is added to the bridge interface. In step 708, the wireless network is extended across a wired network. On the other hand, in step 709, if it is determined that the node device 201 is not functioning in a NAT gateway mode, then the node device 201 assigns its bridge interface an IP address. In step 710, a DHCP client daemon is launched to contact a DHCP server. In step 711, the DHCP server provides a pool of addresses to client devices.

The following is an example of the operation of the management applications described in FIG. 7. The node 201 assigns itself the IP address 10.0.0.1 (only one such gateway should be brought up for any wireless network, or address conflict will occur). If no DHCP server is found, the Ethernet hardware will be added to the bridge interface, extending the network across the wired network (any number of node 201 may be brought up this way). Next, if not in NAT gateway mode, the node device assigns its bridge interface an IP address, for example, of 10.x.y. 1 where x and y are the last two octets of the primary radio card's MAC address. It will hand out DHCP addresses in the block 10.x.y.10 to 10.x.y.210. That allows over, for example, 65,000 node 201 to have a unique pool of addresses where 200 are assigned dynamically and 53 are available for static definitions and other uses.

FIG. 8 is a flow chart illustrating the connection maintenance technique that is implemented either as a serial polling process or as an event-driven response process. In step 800, the control software module 302 in a node device 201 either responds to an event-driven trigger or periodically scans the transceiver's logs for new connections. In step 801, the control software module 302 determines if any new connections are detected. In step 802, if a new connection is found, then the control software module 302 determines whether the new connection is on a channel other than the channel it was detected on. In step 803, if the remote transceiver for the new connection is on a channel other than the channel it was detected on, then the control software module 302 adds the connection to the blacklist for the transceiver which reported the new connection. Alternatively, in step 804, if the remote transceiver for the new connection is on the same channel it was detected on, then the control software module 302 adds the connection to the bridge and, in step 805, calculates the path cost using the connection data rate and the signal to noise ratio before adding the information to the bridge table. The path cost is a calculation that relates to the quality of a MIP connection.

If, in step 801, no new MIP connections were detected, or the connection was added to the transceiver's blacklist in step 803, or the bridge table was updated with the path cost in step 805, then the control software module 302, in step 806, checks to see if the transceiver blacklist entries are still valid. In step 806, if the transceiver's blacklist entries are no longer valid, then the control software module 302 removes the invalid connections from the transceiver's blacklist, in step 807. If the blacklist entries are valid, in step 806, or the connection has been removed from the transceiver's blacklist, in step 807, then the network connections are examined, in step 808, to determine if any connections have expired. A connection is expired by the transceiver when it has not been used for a time period specified by the control software module 302.

In step 809, if it is determined that a MIP connection has expired, then the connection is removed from the bridge. Next, in step 810, the control software module 302 determines if data rate has changed on any connection. In step 811, if the data rate has changed, then the costs are recalculated. Otherwise, the node 201 device either continues to periodically scan the transceiver's logs for new connections or waits until a new event-driven trigger causes the connection maintenance technique to be invoked.

Figure 10A:
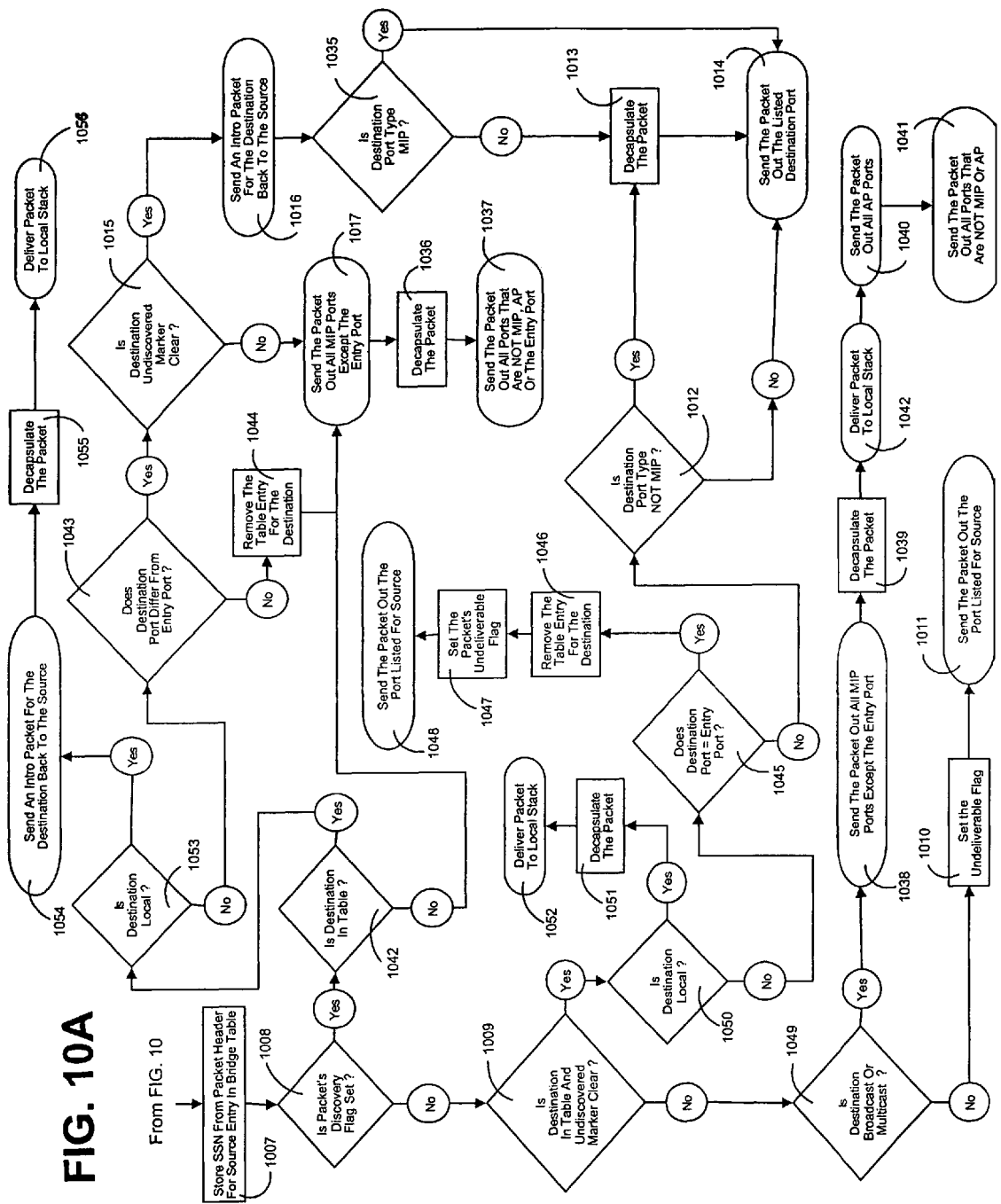
Figure 11:
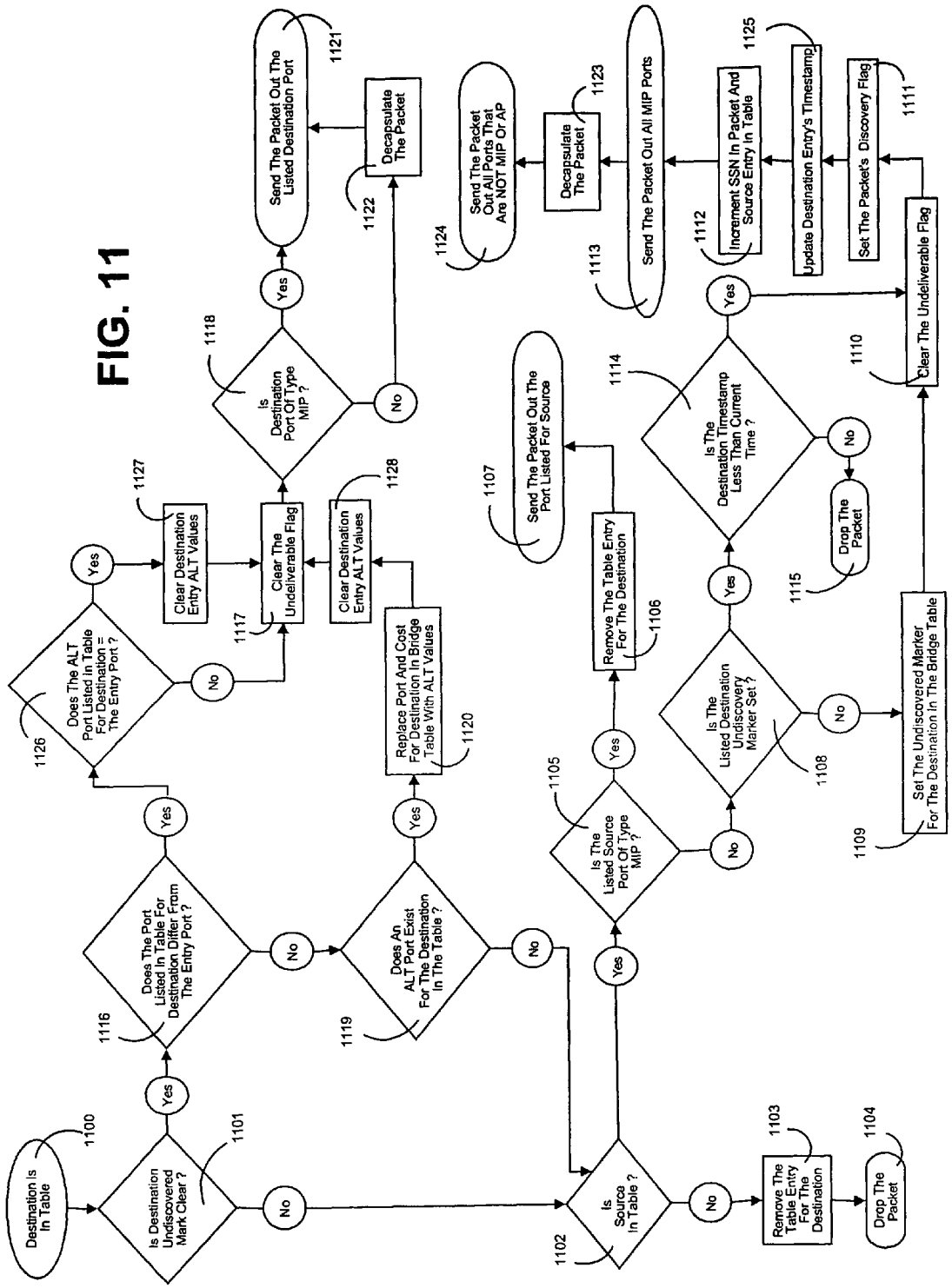
FIG. 11 is a flow chart illustrating a further data packet handling technique in accordance with an exemplary embodiment of the present invention.

Referring momentarily back to FIG. 2, the information that each node device 201 collects about the network 200 and writes into the memory 303 is made available to an administrative device 203. The administrative device 203 communicates with each node device 201 by periodically requesting the information. If a device 201 receives an information request from one or more administrative devices 203, then the data gathered by the node device 201 is transmitted to the administrative device 203. Multiple administrative devices 203 may simultaneously monitor and run on the network 200 by making individual information requests of each node device 201 or by making batch information requests from another administrative device 203 which acts as a proxy for one or more other administrative devices 203. By way of example, the node device 201 periodically sends information to the administrative device that includes the following information:

Node configuration
  IP Address
  MAC addresses
  SSIDs
  Channels
Peers
  MAC addresses
  Associated node NIC
  Signal Quality
  Noise Level
  Link Quality
  Last Transmit Rate
Clients
  MAC addresses
  Associated node NIC
  Signal Quality
  Noise Level
  Link Quality
  Last Transmit Rate FIGS. 9-11 are flow charts illustrating the handling of data packets in an exemplary embodiment of a wireless mobile ad-hoc network using a Layer-2 ad-hoc mesh protocol in accordance with an embodiment of the present invention. More specifically, these figures describe how a data packet can take different paths in the network based on its protocol (its mesh protocol) packet header and the setting up of forwarding table entries, which are used to route data packets originating from the same source.

The advantages of implementing the system as a Layer 2 Protocol is that the routing protocol forms and maintains a multiple path, mesh-like infrastructure. In addition, there are no root or master nodes, alternative routing occurs on single packet drop or failure allowing great mobility of AP node devices, there is support for client device to client device encryption at OSI Layer 2 (which is more secure than L3 encryption), simultaneous support for multiple client device IP addressing schemes, and simultaneous support for IPv4 and IPv6 client devices. The exemplary protocol is a low overhead protocol with fast alternate path healing time and multiple path load balancing.

In an embodiment one or more complete 802.11b radios are provided in a single portable communications unit. In one preferred embodiment, two radios are provided to permit simultaneous Access Point and backbone services on multiple channels. The use of two radios provides wireless gateway functionality on one radio while still providing Access Point and backbone services on the other, and is capable of multiple load balancing connections between nodes. This structure also allows the mitigation of co-channel interference issues that may be a byproduct of having two radios in the same device. In addition, other radio standards such as 802.11g radios or proprietary radios can be used.

The 802.11b radios are provided with larger external antennas than are normally used in home or office 802.11b communications. The antennas are preferably mounted above ground, on a mobile structure such as a vehicle or on a vertical fixed structure, for greater range. The antenna used can be internal omni, external omni, high gain, or directional.

In an embodiment, the configuration and packaging provides an integrated DHCP server, integrated DHCP client, integrated TLS server, GPS support for location reporting to Admin and third-party systems, and automatic channel selection. The device also has multiple model configurations addressing range, operating power, antenna configuration and ruggedness. The system has a range of 0.5-15 kilometers. It can use AC, DC, or battery power and can be mounted on standard or military vehicles.

Administration advantages include a graphical command and control system and the remote administering of channels, connection speeds, gateway functionality, and security. Remote status reporting is also provided for the client devices 201, and software upgrades to the client devices 201 are field installable. The administration is highly intuitive, highly informative and highly scalable.

Security advantages include support for Harris SecNet-11 Type 1 Secure hardware, a protocol that is transparent to client-side L2 and L3 VPN and encryption software, an Integrated AirFortress driver for AES 256-bit encryption of management communications, and an Integrated AirFortress Gateway for AES 256-bit encryption of Ethernet client device. The device is also configured to allow integration of other third-party security technologies.

Gateway advantages include wired gateway support for NAT, port forwarding, Egress mode, Ingress mode and bridging. In addition, there is wireless gateway connection support for: NAT, port forwarding, Egress mode, Ingress mode and bridging, and support for multiple gateway connections to another network In step 900, a data packet enters a network comprising node device 201 and implementing a mesh protocol. The data packet can take any of the various paths available in the network depending on the data packet's ethertype and the flags in the mesh packet header. The following is an example of the mesh packet header.

| Destination Address | Source Address | Ether-type | SSN (4 bytes) | Cost (4 bytes) | IM Flags (2 bytes) | PPROTO (2 bytes) |
|---|---|---|---|---|---|---|
| | | Number | | | | |

In this example, the mesh header is 12 bytes. In the header above, SSN is the source sequence number and Cost is the accumulating cost. The IM Flags are made up of data, introductory, discovery and undeliverable bit flags. Lower-order bits are used to designate the flags (e.g. 4 bits). PPROTO is the original ethertype of the data packet, which is later encapsulated as a mesh packet with the appropriate ethertype. The destination address includes information regarding where the data packet is to be sent and the source address includes information regarding where the data packet originated.

As soon as a data packet enters the bridge network, its ethertype is examined in step 901. If the ethertype is a predetermined type designating the mesh protocol, then the data packet is assumed to have come through a MIP connection. All the data packets that go through MIP ports are encapsulated with the mesh protocol ethertype. The handling of encapsulated packets will be discussed with reference to FIG. 10.

If the ethertype of the data packet is anything but the mesh protocol, then it is assumed to have come through a non-MIP port (i.e., AP port or Ethernet port). If the data packet entered though a non-MIP port, control passes to step 902, and the ethertype of the data packet is examined to determine if it an allowable type. If it is not an allowable ethertype, the packet is dropped in step 903. Otherwise, if the packet is of an allowable ethertype, the packet source address is examined, in step 904, to determine if it from an allowable source. If it is not from an allowable source address, the packet is dropped in step If the packet is from an allowable source address, in step 906, the source address is compared against a bridge table stored and maintained in the network node device 201.

If the source entry is not in the bridge table, control passes to steps 907, 908 and 911, wherein an entry is made in the bridge table with all the required fields such as the port number that the data packet came in on, the entry timestamp, the cost of the port on which the data packet arrived and the random SSN. Additionally, in step 912, the introductory flag is set in the data packet to indicate a new entry and control passes to step 910 and then to step 913.

If the source entry is in the bridge table in step 928, then the undiscovered marker is examined in step 928. In step 929, if the undiscovered marker is not cleared, then the undiscovered marker in the bridge table is cleared and control passes to step 908 and the bridge table entry is updated with the new port number, timestamp and SSN. From step 908, the data packet follows the same route as previously discussed. On the other hand, if the undiscovered marker is cleared, then control passes to step 930, where the source entry timestamp is updated, an ALT cost handler process is performed in step 909, and control then passes to step 910 where the source entry timestamp is updated. Then, the destination is examined in step 913.

Next, in step 913, the destination address is compared against the bridge table entries. If there is no match, control passes to step 935 shown in FIG. 9B. Referring to FIG. 9B, in step 932, if the destination is determined to be either a broadcast or multicast destination, control passes to step 933 and the packet is sent out on all AP ports. In step 938 the packet is delivered to the local stack and control passes to step 931.

If the destination is not a broadcast or multicast, control passes to step 914 and a destination entry is created in the bridge table. In step 915 the awaiting discovery marker is set. The destination entry timestamp is updated in step 934 and control passes to step 931. In step 931, the packet is sent out on all ports that are not designated as MIP, AP or the entry port. Then, in steps 916-918, the data packet is encapsulated, the discovery flag set and the data packet is sent out on all MIP ports.

Figure 9A:
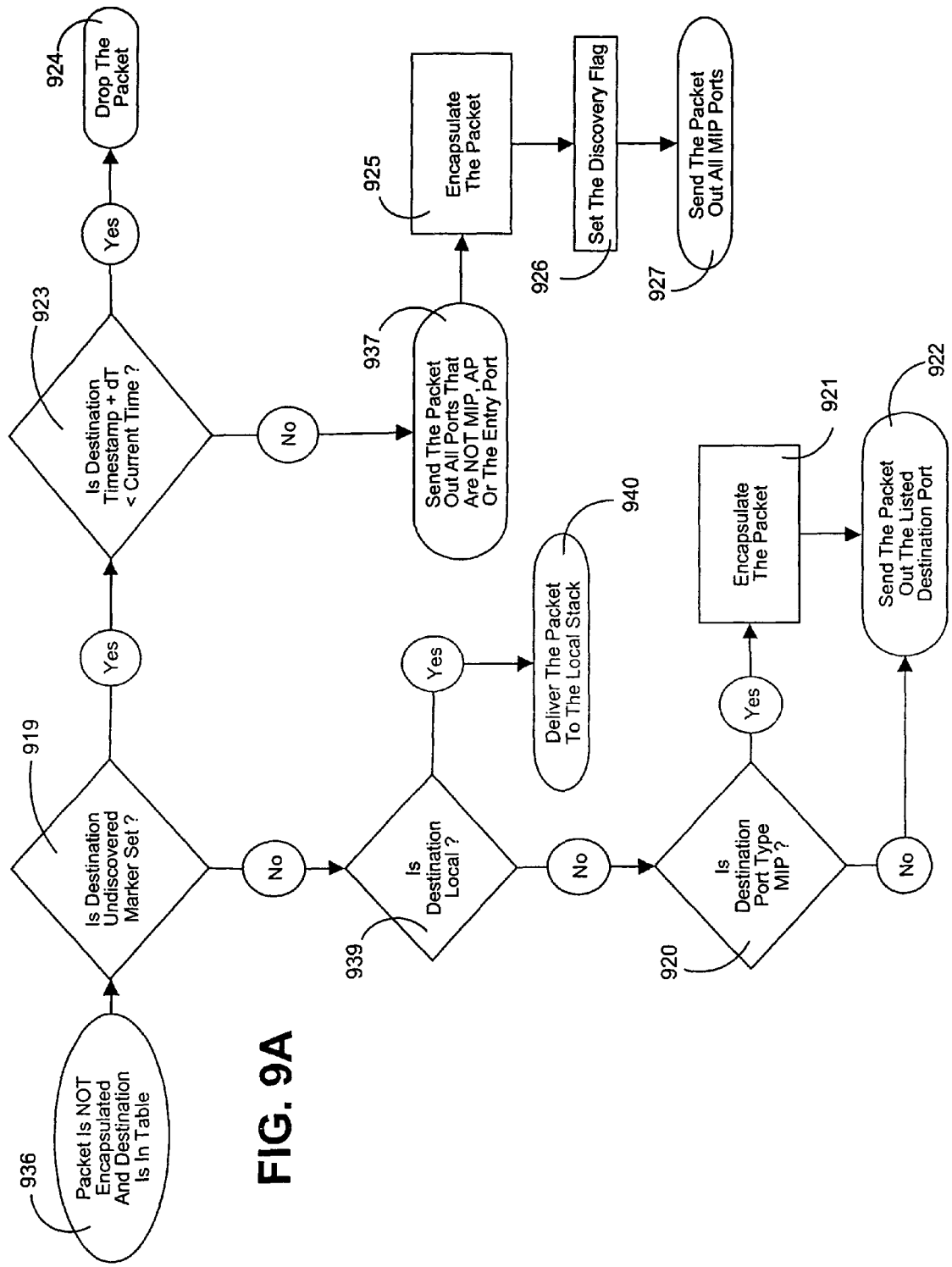
Figure 9B:
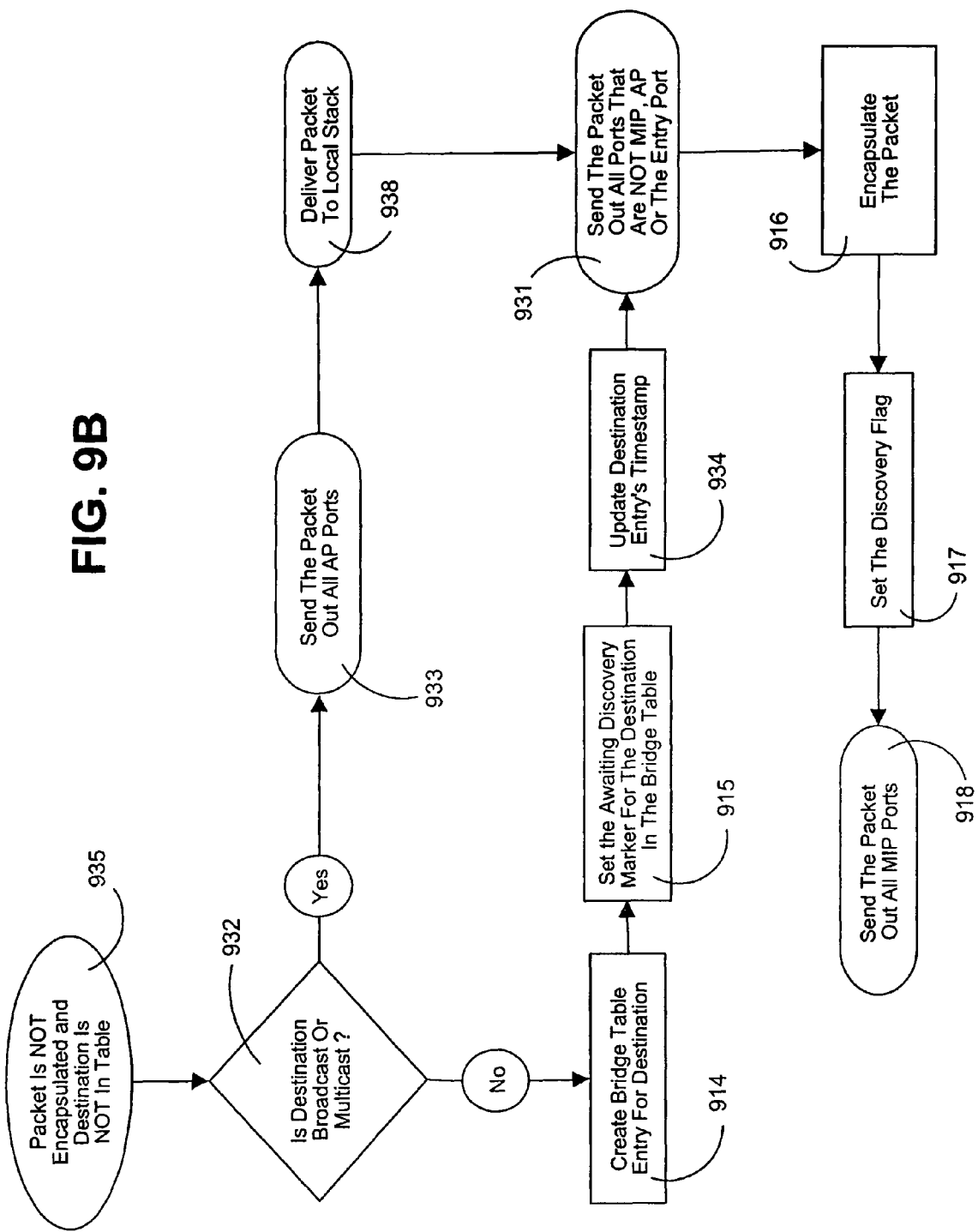

Referring again to FIG. 9 and step 913, if the destination entry is found in the bridge table, then control passes to step 936 shown in FIG. 9A and to step 919. Referring to FIG. 9A, in step 919 the undiscovered marker is examined. If the undiscovered marker is not set, then control passes to step 939 to check whether the destination is local. If so, control passes to step 940 and the packed is delivered to the local stack. If not, control passes to step 920 and the destination port type is checked to determine if it is MIP. In step 921, if the destination port is a MIP port, then the data packet is encapsulated as the mesh protocol ethertype, and sent out the listed destination port in step 922. If the destination port is not a MIP port, from step 920 control passes to step 922 and the data packet is sent out the listed destination port unencapsulated.

Referring again to step 919, if the undiscovered marker is set, then control passes to step 923 and the destination timestamp plus the delta-time is compared against the current timestamp. If the destination timestamp plus the delta-time is less, the data packet is dropped in step 924. Otherwise, control passes to step 937, and the data packet is send out on all port that are not MIP, AP or the entry port. Then, in steps 925, 926, and 927, the data packet is encapsulated with the mesh protocol ethertype, the discovery flag is set and the data packet is sent out on all the MIP ports.

Figure 9C:
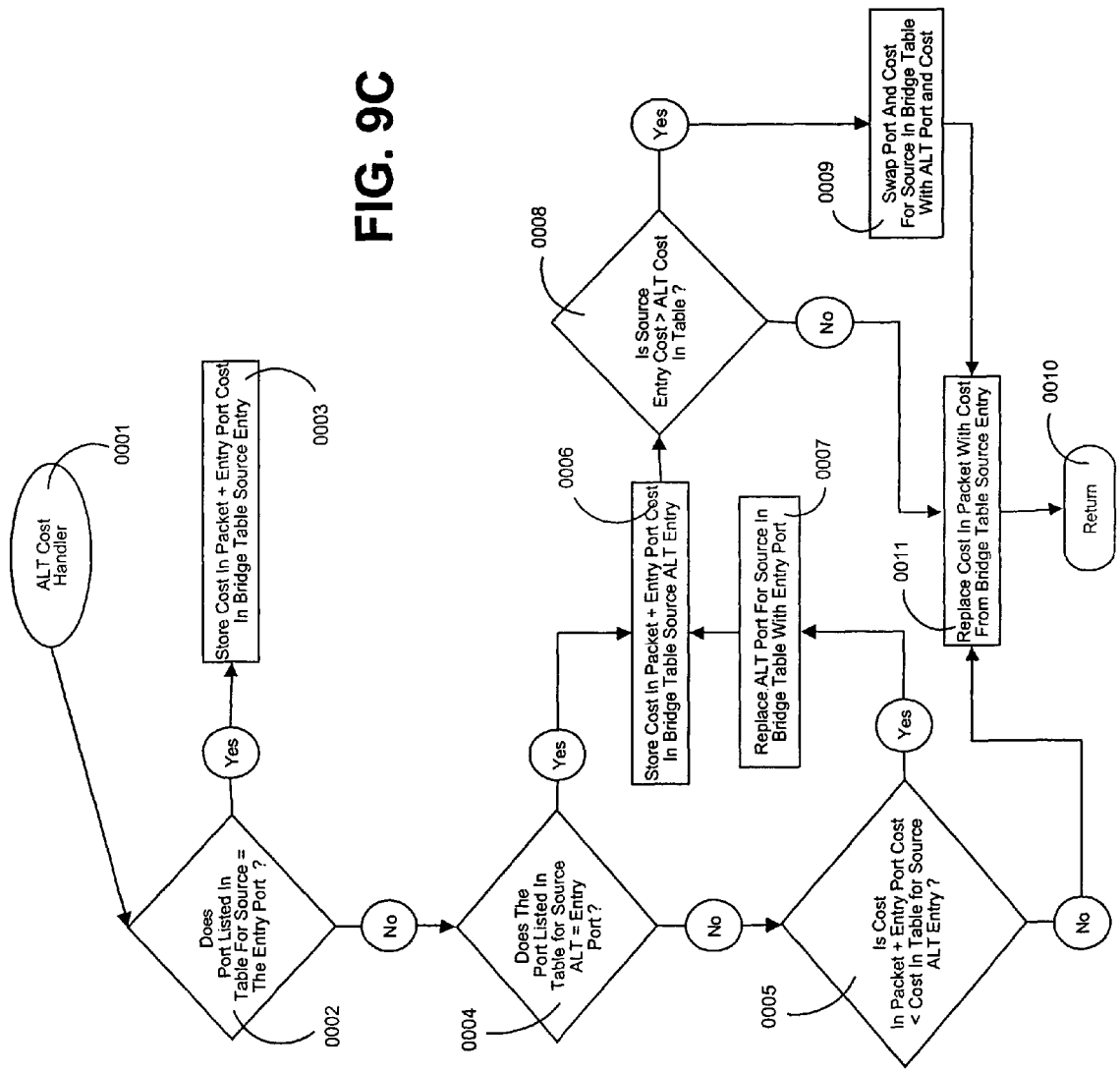

FIG. 9C is a flowchart showing an exemplary embodiment of the ALT cost handler process of step 909 in FIG. 9. This process is used to maintain cost information for transmissions to each known destination in a table in the device. Cost information is also carried by each packet, as an aid in dynamically updating the table entries so that the network can continuously reconfigure itself to route packets by the most effective path. The process begins with step 0002, where the entry port is compared to the port listed in the table for the source. If the entry port is the source port listed in the table, control passes to step 0003, and the cost stored is equal to the cost in the packet plus the entry port cost from the bridge table source entry. If not, control passes to step 0004. If the entry port is the port listed in the table for source ALT, control passes to step 0006 and the cost value carried by the packet plus the stored entry port cost are stored in the bridge table source ALT entry. If the entry port is not the port listed for source ALT, control passes to step 0005. If the cost stored in the packet plus the entry port cost is less than the cost in the table for source ALT entry, control passes to step 0007 and the ALT port for the source in the bridge table is replaced with the entry port, since the entry port apparently has a lower cost, and control then passes to step 0006.

If the cost stored in the packet plus the entry port cost is not less than the cost in the table for source ALT entry, control passes to step 0011 and the cost in the packet is replaced by the cost from the bridge table source entry, and the process ends at step 0010.

From step 0006, control passes to step 0008. In step 0008 the source entry cost is compared to the ALT cost in the table. If the source entry cost is greater than the ALT cost, control passes to step 0009, the port and cost for the source in the bridge table are replaced by the ALT port and cost, and control passes to step 0011. If the source entry cost is less than or equal to the ALT cost, control passes from step 0008 to step 0011.

Thus, FIG. 9C shows a process in which alternative routings having a lower cost are dynamically implemented in the bridge table for each device in the network, using cost information transmitted via packets. Further, packets that are flowing by a route that has a higher cost are automatically dropped to control the level of traffic in the system.

In the above steps, where the cost in a data packet is compared against the port cost for a source entry, the cost is sometimes set in a way to force a data packet to use a different channel. For example, the port cost is set to an exorbitant value so that the data packet is forced to use a different channel. In that way, the existing bandwidth can be better utilized by preventing data packets from hogging a specific channel.

FIGS. 10 and 10A show a process for the situation where it is determined that the data packet is a mesh protocol encapsulated in step 901 shown in FIG. 9. In that case, referring again to FIG. 10, control passes to step 1000. A mesh protocol ethertype means the packet came in on a MIP connection from another client device 201; this packet type is arbitrarily designated as a packet type for the present protocol. Of course, another packet type designation or another flag or method of distinguishing packets that are compliant with the present protocol can be used if desired. An identifiable designation is desirable so that the devices operating under the protocol can instantly tell whether the packet has been analyzed and wrapped in the protocol wrapper, which for example may include routing information, cost data, and other information. If the data packet entered through a MIP port, then in step 1001 the undeliverable flag in the data packet is examined. If the undeliverable flag is set then the destination is examined in step 1033. If the destination address is not in the bridge table, then the packet is dropped in step 1034. If the destination address is in the bridge table control passes to step 1100 shown in FIG. 11.

If the undeliverable flag is not set in step 1001, then the source address of the data packet is compared against the bridge table entries in step 1002. If the source entry is not present in the bridge table, then an entry is created for the source in the bridge table in step 1003. Additionally, in steps 1004 and 1005, the source entry is updated with the port number that the data packet came in on, the cost entry is updated with the cost of the port the data packet came in on plus the cost from the packet header for the source entry in the bridge table, and the source entry timestamp is updated. Control then passes to step 1007 in FIG. 10A.

Referring again to step 1018, if the source entry is in the bridge table, then the undiscovered marker is examined. In step 1019, if the source undiscovered marker is set, or "not clear," then the undiscovered marker is cleared for the source entry in the bridge table in step 1019. From step 1019, control passes to step 1004 and the source entry is updated with the port number. From step 1004, the steps are executed as previously discussed.

If the source undiscovered market is clear, control passes to step 1006 in which the ALT cost handler process shown in FIG. 9C is executed. After that process, control passes to step 1020, and the introductory flag is examined. If the introductory flag is not set, then the source SSN in the bridge table is compared to the SSN in the packet header in step 1033. If the source SSN is not less than the SSN in the packet header, the packet is dropped in step 1034. In step 1033, if the source SSN is less than the SSN in the packet header, then control passes to step 1005.

However, if the introductory flag is found to be set in step 1020, then the source SSN in the bridge table is compared against the SSN from the packet header in step 1021. More specifically, the following check is performed. It is determined if the data packet SSN in the packet header is less than or equal to the SSN in the bridge table and greater than SSN minus deltaS. Additionally, it is determined if the current time is less than the timestamp plus deltaT for the source entry. If the condition examined in step 1021 is not true, control passes to step 1005. If the condition is true, the packet is dropped in step 1026.

Referring now to FIG. 10A, in step 1007, the SSN entry is updated with the SSN from the packet header. The discovery flag of the data packet is then examined in step 1008. In step 1009, if the discovery flag is not set, then it is determined whether the destination is in the bridge table and the undiscovered marker is clear. If either of those conditions do not exist, control passes to step 1049. If the destination is broadcast or multicast, the packet is sent out all MIP ports except the entry port in step 1038. Then, in step 1039, the packet is de-encapsulated and delivered to the local stack in step 1042. The packet is sent out on all AP ports in step 1040 and on all ports that are not MIP or AP in step 1041.

If the destination is not broadcast or multicast, control passes to step 1010 and the undeliverable flag is set. Then in step 1011, the data packet is sent out the port listed for the source.

Referring again to step 1009, if the destination is the in the table and the undiscovered marker is clear, control passes to step 1050 for a determination of whether the destination is local. If so, the packet is de-encapsulated in step 1051 and delivered to the local stack in step 1052. If the destination is not local, control passes to step 1045. If the destination port is the entry port, control passes to step 1046 and the table entry for the destination is removed. In step 1047, the packet's undeliverable flag is set and the packet is sent out the port listed for the source in step 1048.

If in step 1045 the destination port is not the entry port, control passes to step 1012. If the destination port is not MIP, control passes to step 1013, since the destination port must be an AP port. The data packet is de-encapsulated in step 1013 and sent out listed destination ports in step 1014. On the other hand, if the destination port is not an AP port, then control passes to step 1014 and the data packet is sent out listed destination ports "as is".

Referring again to step 1008, if the discovery flag is set, control passes to step 1042. If the destination is in the bridge table, then control passes to step 1053. If the destination is local, control passes to step 1054 and an introductory packet for the destination is sent back to the source. The packet is de-encapsulated in step 1055 and delivered to the local stack in step 1056.

If the destination is not local in step 1053, control passes to step 1043 and it is determined whether the destination is different from the entry port. If so, control passes to step 1015. If the destination uncovered marker is clear, control passes to step 1016, where an introductory packet for the destination is send back to the source. Then, in step 1035, if the destination port is MIP, then the packet is sent out the listed destination port in step 1014. If the destination port is not MIP, the packet is de-encapsulated in step 1013 and sent out the listed destination port in step 1014. If the destination marker is not clear in step 1015, control passes to step 1017.

Referring again to step 1043, if the destination port is the same as the entry port, the table entry for the destination is removed in step 1044 and control passes to step 1017.

FIG. 11 is a flowchart showing an exemplary embodiment of one process that can be applied when it is determined that the data packet is encapsulated for the present network the undeliverable flag is set and the destination is in the bridge table as determined in step 1033 (shown in FIG. 10). In step 1033, when it is determined that the destination is in the table, control passes to step 1100 (shown in FIG. 11). The process of FIG. 11 starts with examination of the destination undiscovered marker in step 1101. If the destination undiscovered marker is not clear, control passes to step 1102 and the source address is compared against the bridge table entries. If the source address is not in the bridge table, control passes to step 1103 and the bridge table entry for destination is removed from the bridge table. Then, the data packet is dropped in step 1104.

If in step 1102 the source is in the bridge table, then the process continues at step 1105 where the listed source port-type is examined. If the listed source port-type is MIP, then the process continues at step 1106 where the bridge table entry for destination is removed from the bridge table. Then in step 1107 the data packet is sent out the port listed for the source. If, however, in step 1105 the listed source port is not a MIP port, then the process continues with step 1108 where the data packet is checked to see if the destination entry is awaiting discovery (e.g. the undiscovery marker is set). If the listed destination is not marked as awaiting discovery, then the awaiting discovery marker for the destination is set in the bridge table in step 1109. Then in step 1110, the undeliverable flag in the data packet is cleared, and the discovery flag is set in step 1111. The process then continues at step 1125 where the destination entry's timestamp is updated. Then in step 1112, the SSN value is incremented in the data packet and in the source entry of the bridge table, and in step 1113 the data packet is sent out on all the MIP ports. The process continues at step 1123 where the packet is de-encapsulated and then at step 1124 where the packet is sent out all ports that are not MIP or AP.

If the data packet destination is marked as awaiting discovery in step 1108, then the process continues with step 1114 where the destination timestamp is examined. If the destination timestamp is less than the current time, then control passes to step 1110 and the data packet is processed as described previously starting with step 1110. If the destination time stamp is greater than the current time, then the process continues at step 1115 where the data packet is dropped.

Referring again to step 1101, if the undiscovered marker is clear, control passes to step 1116 and the port listed for the destination is further examined. If the destination port differs from the entry port on which the data packet arrived, then the process continues with step 1126. If the destination port is the same as the entry port, control passes to step 1119, where it is determined whether an ALT port exists for the destination in the table. If an ALT port does not exist, control passes to step 1102 and the process continues as described previously from step 1102. If an ALT port exists, control passes to step 1120. In step 1120, the port and cost information for the destination is replaced in the bridge table with the ALT values. Then, in step 1128, the destination entry ALT values are cleared, and the process continues with step 1117.

In step 1126 the ALT port listed in the table for the destination is compared to the entry port. If the ALT port for the destination is the same as the entry port, the process continues at step 1127. In step 1127 the destination entry ALT values are cleared and the process then continues at step 1117. If in step 1126 the ALT port is not the same as the entry port, step 1127 is bypassed and the process continues at step 1117.

In step 1117, the undeliverable flag in the packet header is cleared. Then in step 1118, the destination port is examined. If the destination port is a MIP port, step 1121 is performed and the data packet is sent out the listed destination port. However, if the port is not a MIP port, then the process continues at step 1122 where the packet is de-encapsulated, after which control passes to step 1121 where the data packet is sent out the listed destination port.

The protocol used by devices in the network preferably includes a specific method for assigning costs to a particular route. The weights of the various parameters used to determine route costs can be manually or automatically configured for a specific deployment scenario. The "Cost" of choosing any particular bridge port to send a packet out is set to higher values for less desirable paths and lower ones for more desirable ones. When the bridge sends a packet out the lowest cost port capable of reaching the destination it can be assumed it is taking the most efficient path to that destination. This assumption is true if costs are set appropriately. In an embodiment, the following factors are considered when setting those costs:

1) High-bandwidth ports should have lower costs than lower-bandwidth ports.
2) The cost for repeating a packet on the same radio channel from which it was received should be increased to encourage channel-changing, which should reduce collisions and better utilize total system bandwidth, when such a change is practicable (requires both multiple transmit channels, and known paths on alternate channels).
3) Overloaded ports should have their costs temporarily increased during overload conditions to encourage better load balancing.
4) Out-of-Mesh Balancing—The administrator may have multiple exit points from the mesh and may wish to balance or otherwise tailor the loads across those points. Allowing some level of administrative control over the costs of ports at those exit points can be potentially helpful in some types of deployments.

Scalability of a mesh routing protocol network can be severely limited when flood packets are supported. Additionally, floods can be used as a method for Denial of Service (DOS) attack. Eliminating flood packets for a network is typically not an option because numerous network services rely upon floods for some portion of their operation. Various techniques exist for limiting flood packets on a network. These include time and hop limits. The network disclosed herein is preferably configured either manually or automatically to use a flood limiting protocol that is best suited for a specific deployment scenario. In particular, preferably the protocol can be configured for several different flood limiting methods which can be either administratively or automatically selected for a particular operating scenario.

In an embodiment, a more efficient flood mechanism is combined with responder daemons to intercept potentially flooding packets before they need to actually flood.

One method that is implemented in some embodiments is Center-Out Flooding. Instead of a potentially flooding packet immediately flooding from its entry point on the mesh it is first carried to a "core" region of the mesh and flooded if necessary from there. There are two steps to this type of flood.

First is "Inward Propagation" which is unicast, and from there the standard flood mechanism is used if needed.

In other embodiments, an Inward Propagation method is used, in which potential "flood" packets are first carried as unicast packets towards the densest part of the mesh. This "Core" region of the mesh is not determined conclusively, but instead each node designates one of its ports as "Towards Core" based on which one has the most bridge table entries (or in a tie, the lowest MAC address). Determining this port is best done periodically rather than on-demand since the determination can be time consuming with a big list and perfect accuracy is not required. Note that there is no actual "core" anywhere in the network, just each individual node's impression of which way is "towards core".

In these embodiments, a Standard Flood method may also be employed. If the node's loop detection realizes that a potential flood packet that was following the Inward Propagation path has come back to it, it will no longer send it "towards core" but instead turn it into a "Standard" flood packet and let it propagate outward using the typical flooding mechanism. Since this node is very likely somewhere near the center of the mesh the outward flood propagation should quickly reach each node.

In some embodiments, tailored daemons running on every node accumulate the "Answers" to the various types of queries that are typically sent via broadcast packets. At the lowest level there are responses to the mesh protocol's discovery requests that can be intercepted and responded to by such a daemon. At higher levels daemons can perform a similar function for ARP requests, DHCP requests and doubtlessly many other services as well.

When a recognized "request" packet reaches a node with a daemon that "knows the answer" to the request, the request packet is halted (no longer sent towards core or flooded) and the appropriate response is sent to the requester on behalf of the host that would otherwise (in a more traditional setup) have responded. For some types of daemons (like DHCP) it may make more sense to simply proxy the request straight to the expected responder in a unicast packet.

The Daemons are preferably provided with a mechanism to determine the correct responses on their own. In many cases this information can be passively determined by observing response packets that traverse the node in response to requests they were unable to intercept, or other packets known to contain such information.

Figure 12:
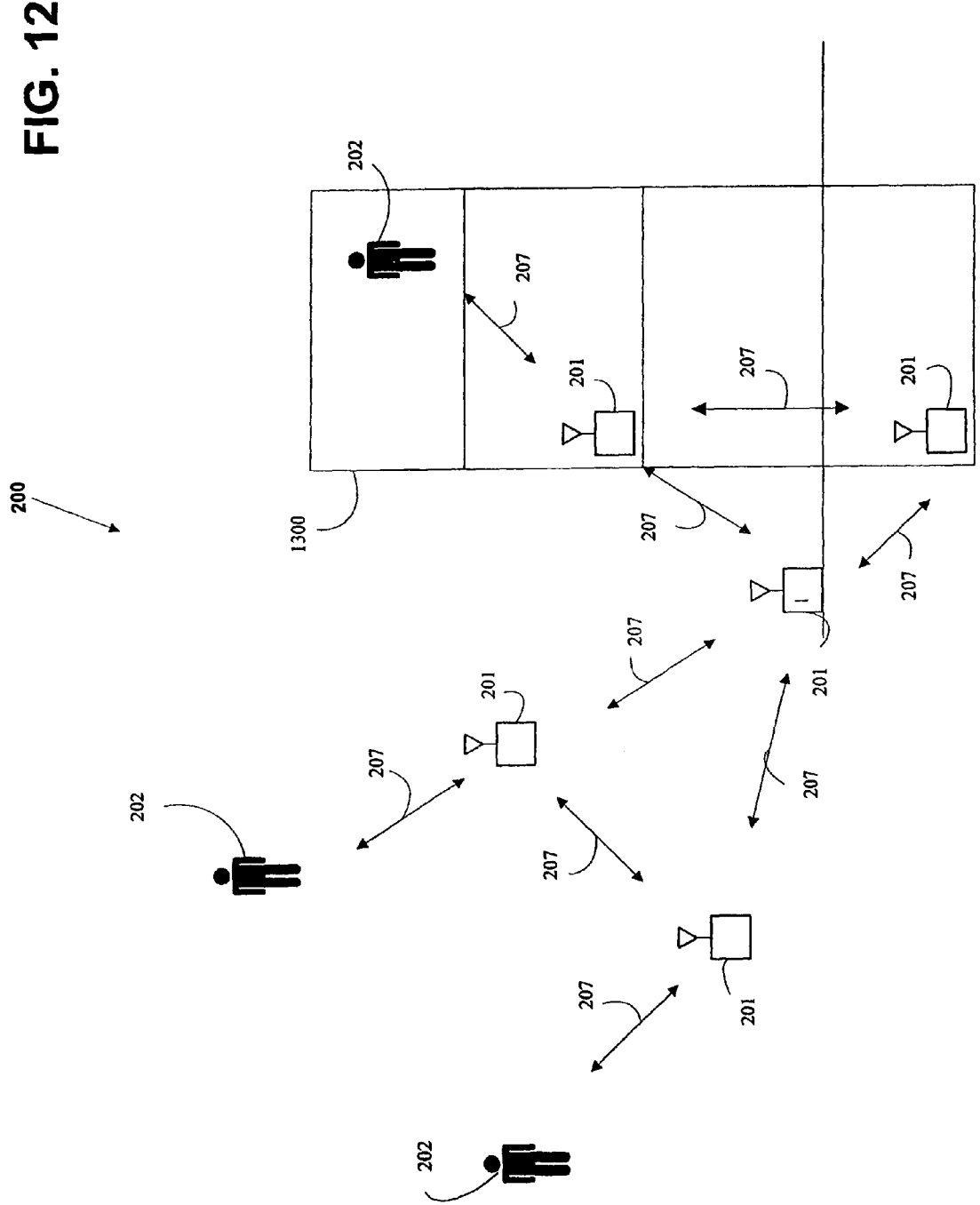
FIG. 12 is a system diagram illustrating an application of a wireless mobile ad-hoc network in accordance with an exemplary embodiment of the present invention.

FIG. 12 is a system diagram illustrating an exemplary application of a wireless mobile ad-hoc network in accordance with one of many possible embodiments of the present invention. The wireless mobile ad-hoc network 200 includes a plurality of node devices 201 in communication via communication links 207. In an embodiment, the devices 201 are each running the protocols described herein.

The wireless network 200 may be used to provide network connectivity to a plurality of clients 202. A client may be an operator or a device that serves a desired computing and/or communications purpose of an operator, referred to as a client device. A client device 202 may communicate with another client device 202 by first connecting through a node device 201, which provides a gateway function to the network. A client device 202 can connect to any node device 201 and roam seamlessly across the network 200. The wireless links 207 between a client device and the node device 201 may, for example, be links that conform to the IEEE 802.11b standard.

In some embodiments, node devices 201 are provided with a protection casing that provides protection from changing or harsh environmental conditions. In FIG. 12, two node devices 201 are placed on different floors in a building or structure 1300. An omni-directional antenna on each device allows for easy relocation without the difficulty of antenna repositioning. Of course, directional antennas can also be used if enhanced range is desired in a known direction. The distance between the node devices 201 may generally be between 500-1000 feet. However, the range will vary depending on the radio band in use by the node devices 201, the transmit and receive amplification of each transceiver, and the gain of the antennas used in each node device 201.

In some preferred embodiment, 802.11b radios are used. Most wireless client devices support 2.4 GHz 802.11b or 802.11g radios for access point (AP) functions. In addition, 802.11a (5.4 GHz) provides a large bandwidth and is popular for backbone and meshing functions, but has a limited range.

It should be recognized, however, that although 802.11b radios are used in the preferred embodiment, the system and protocol can be used for other radio standards such as 802.11a, 802.11g and future standards such as 802.11n (generally referred to as "Wireless Ethernet" or "Wireless LAN"). Wireless Ethernet systems such as those using 802.11b radio frequency (RF) signals in the 2.4 GHz ISM band are attenuated by building walls. However, the system of the present invention may provide broadband continuity between a plurality of node devices 201, even around walls or other obstacles by using multiple devices to create a network of "hops" around the obstacle. The node devices 201 may be positioned within the network in any order as long as each node device 201 is able to wirelessly communicate without forming an island (i.e., one or more devices connected to each other but not to the rest of the network).

This network 200 provides for a very robust wireless network because node devices 201 can automatically reconfigure the network if an undesirable network condition arises. For instance, the network can be reconfigured to establish a new optimal path between two points on the network. In a wired network, the connections are fairly stable and the routing protocol can put more emphasis on speed versus recovery from route failure or even route congestion. In the wireless network, the existence and quality of any given link is subject to interference from other RF sources, out of phase reflections of the signal, and physical obstructions, such as vehicles, which move the path between communicating devices. Additionally, mobile environments, in which the present system may operate, may have nodes which move in and out of range of each other.

The exemplary protocols disclosed herein are able to quickly respond to changes by storing alternate communications path information at every node. Thus, excessive discovery time is not required when a network change occurs, and excessive overhead is not required prior to network changes. Accordingly, a hybrid active/reactive path discovery protocol is provided. Certain events trigger a conservative amount of active discovery in the form of introductory messages and discovery requests, but for the most part, each node is able to discover and track multiple path options by updating local tables with information culled from the packet wrappers of packets it receives and passes on. Additionally, the wireless network 200 can support a wide variety of client devices 202 as long as they are able to communicate with a node device 201. The client devices 202 may be off-the-shelf 802.11b compatible devices. The client devices 202 are not limited to any particular form as long as they are able to communicate with a node device 201.

The overhead in an exemplary embodiment disclosed herein is 12 bytes per packet. For high-throughput applications at maximum packet sizes, this is about 0.6% additional overhead, though measuring overhead is a complex function involving maximum, minimum, and average packet sizes, counts, and rates, as well as update frequencies and per-node bandwidth availability.

The client devices 202 may be any desired device. For example, client devices 202 may include sensors, still cameras, video cameras, computers, internet protocol (IP) phones or other devices configured to communicate on a wireless communication network. A plurality of exemplary client devices are shown in FIG. 3. Sensors may include, but are not limited to, temperature sensors, chemical sensors, biological sensors, or nuclear sensors.

By way of example, a biometric sensor may be attached to a fireman, for example, to detect and transmit the fireman's biometric information via the wireless communication network 200 back to a base station (not shown). The base station may be an external device coupled to the network 200 via a gateway node device 201. The sensor allows the fireman's biometric information to be monitored without manual input from the fireman.

Figure 13:
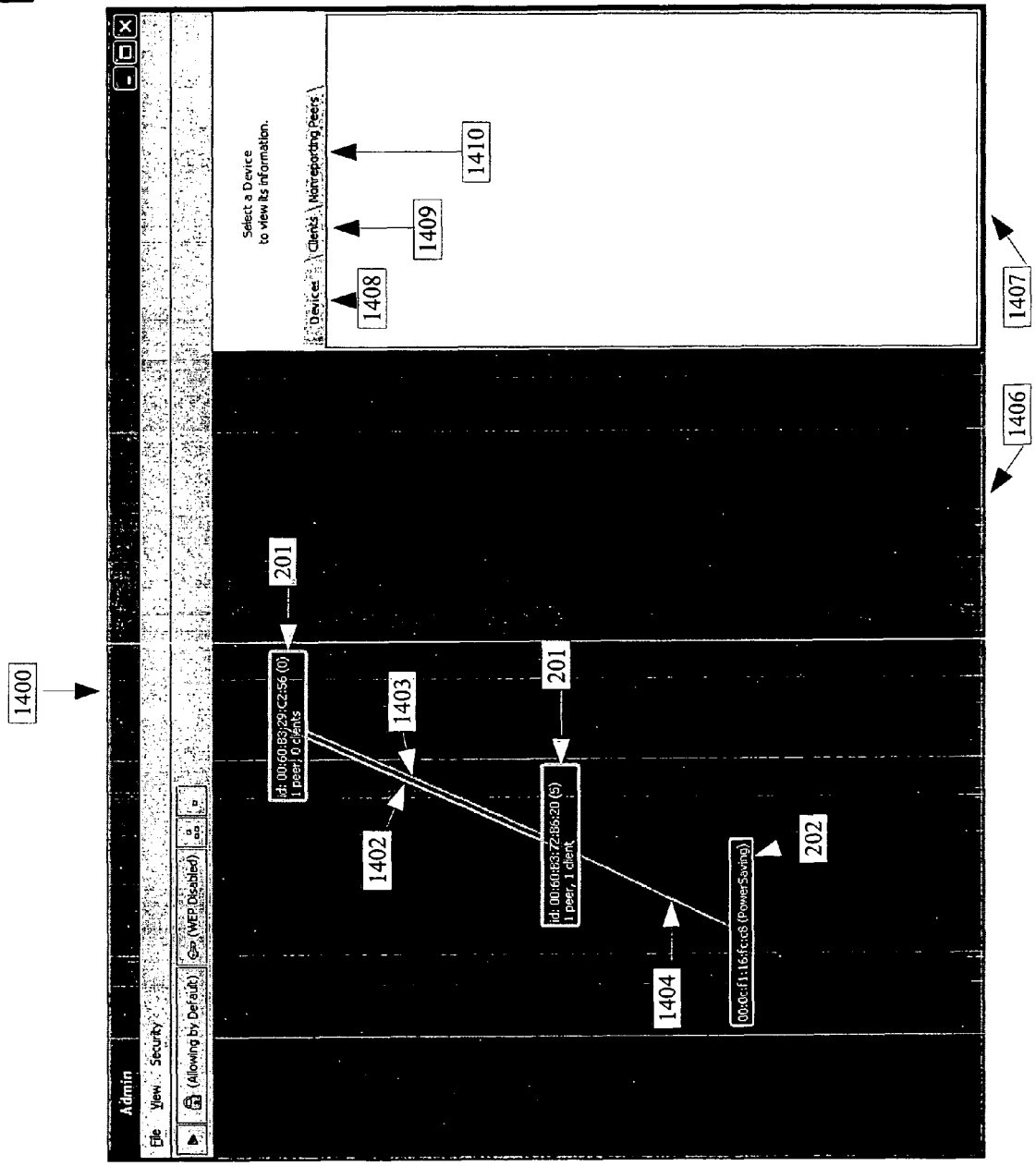
FIG. 13 is a screen shot of an administrative technique used for a wireless mobile ad-hoc network in accordance with an exemplary embodiment of the present invention.
Figure 14:
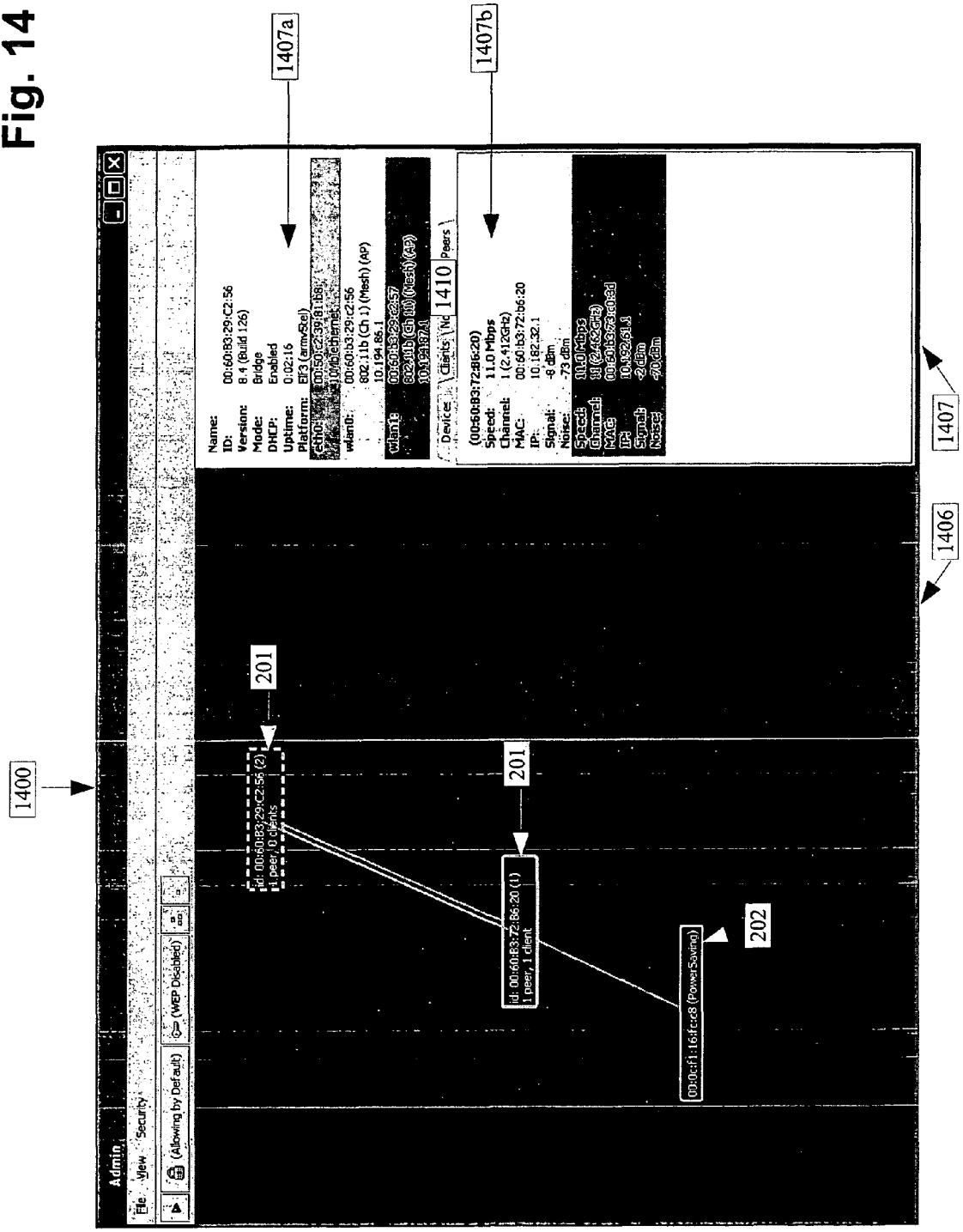
FIG. 14 is a screen shot of an administrative technique used for a wireless mobile ad-hoc network in accordance with an exemplary embodiment of the present invention.
Figure 15:
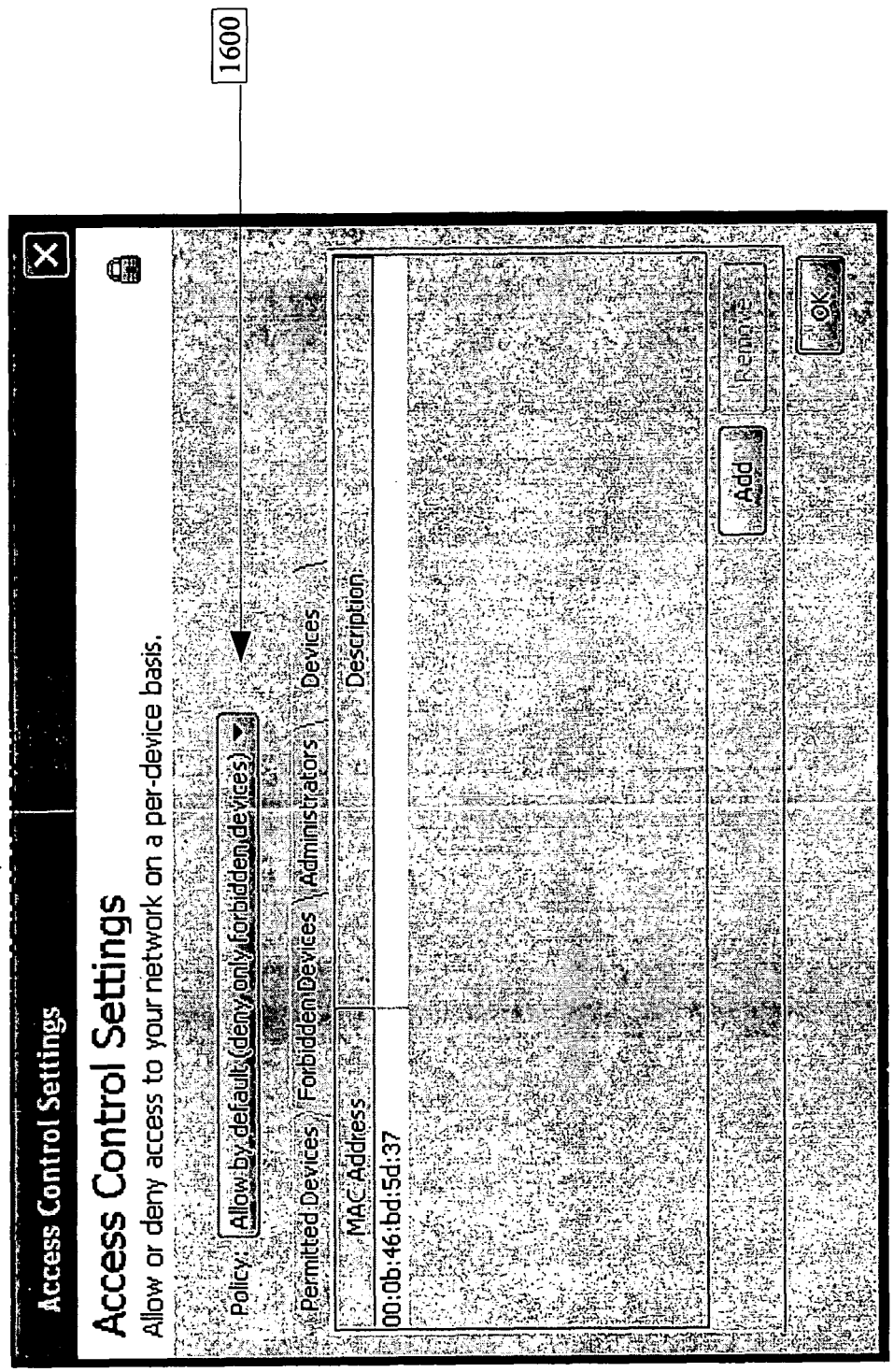
FIG. 15 is a screen shot of an administrative technique used for a wireless mobile ad-hoc network in accordance with an exemplary embodiment of the present invention.

FIGS. 13-15 are screen shots illustrating exemplary administrative features that may be provided for the portable wireless network in some embodiments of the present invention. Referring briefly to FIG. 2, an administrative device 203 communicates with the wireless network 200 via the LAN 204 and a wired connection 205. The administrator can be a PC or the like that is capable of graphically illustrating a topology of the wireless network 200 as well as monitoring and controlling network devices. However, the administrative device 203 is not limited to use with a wired connection 205, and is adapted to communicate with the network 200 via a wireless connection that is compatible with the node device 201.

The administrative device 203 can act as a management proxy for other devices in communications with the administrative device 203 by providing information and responding to management requests made by those other devices. The proxy capabilities will be provided by the administrative device 203 to the other devices through communication protocols which, by way of example, include Simple Network Management Protocol (SNMP) and other standards based as well as proprietary management protocols.

When an administrative application is launched on administrative device 203, a screen such as the exemplary screen 1400 shown in FIG. 13 is provided to an administrator. The screen 1400 of the administrative device 203 provides a topographical view of the current network. In this example, the screen 1400 is divided into two sections 1406, 1407 for gathering information regarding the current network devices. The area on the left side 1406 is animated in order to accommodate the frequent topological changes that can occur within a wireless network. For a more visually appealing and understandable graphical display of the network, all node devices 201 and client devices 202 "repel" one another in the graph, while the connections 1402, 1403, 1404 between them act as "springs". Additionally, the graphic display may use a coloring and line pattern scheme for providing additional information regarding the network devices as well as the channels being used and the speed and quality of the connections. The left side 1406 provides the topographical layout of the network 200 while the right side 1407 provides the more detailed identification information for each device as well as the channels being used. It is important to note that both types of information can be viewed simultaneously on screen 1400.

The left side 1406 of the screen 1400 shows three devices connected in the network. Specifically, from top to bottom, two node devices 201 and a client device 202 are shown. Additionally, the two node devices 201 can be seen communicating using two channels 1402, 1403 while the client device 202 is seen communicating with a node device 201 via a channel 1404. As seen on the right side 1407, a user can obtain detailed identification information regarding a network device by selecting one of the three tabs 1408, 1409, 1410 as shown.

FIG. 14 shows an example of a screen display that may be produced when the user has selected a node device 201 graphically displayed on the left side 1406 of the screen 1400 in FIG. 13 to gain specific identification information related to that device 201. Once selected, the node device 201 is displayed in a manner to indicate that a selection has been made. Here, the node device 201 is highlighted with a broken line border. Once selected, the right side 1407 acts as an information panel giving details of the various operating parameters of the node device 201. The upper right hand side 1407a provides information regarding the node device 201 selected such as the name, ID, mode of operation and network interfaces being used.

By way of example, The ID holds the information about the MAC address, which is a unique number assigned by the manufacturer. The mode gives information regarding in which capacity the node device 201 is operating. Here, the node device 201 is in a regular mode of operation, meaning that it is not operating as a gateway device. "Wlan0" and "Wlan1" provide information about the network interface being used by the transceivers in the device 201. For example, Wlan0 carries the information for one transceiver and Wlan1 carries the information for the other transceiver.

In section 1407b, information can be gained regarding the other node device 201 communicating with the selected node device 201. The information provided includes ID information, data rate, signal strength, and noise level of the channels being used. Although not shown here, similar information regarding the client device 202 can also be obtained on the right side 1407 of the screen 1400.

When a node device 201 is operating as a wired or wireless gateway, or a wired bridge, the information displayed is slightly different. For example, the mode will be indicated for the device 201.

FIG. 15 provides an example of an access control function that may be provided by the administrative device 203 in some embodiments. The access control settings 1600 give an administrator the ability to control which devices can gain access to the network. By utilizing a MAC address and description of the device, an administrator can set access policies for each device on the network. Examples of the access policies used by the administrator include, "No Access Control," Deny by Default," and "Allow by Default." The administrator can use the appropriate selection tabs (i.e. add and remove buttons) to determine what devices are on the access control list.

Additionally, the administrative device 203 may send commands to selected devices in the network and receive communications from those devices. Examples of the types of commands that can be sent include, a "Set Name" command, a "Set Location" command, a "Retrieve Location" command used to obtain the geographic location of a device equipped with a position sensing device, an "Upgrade Firmware" command and a "Disable DHCP" command.

Figure 16:
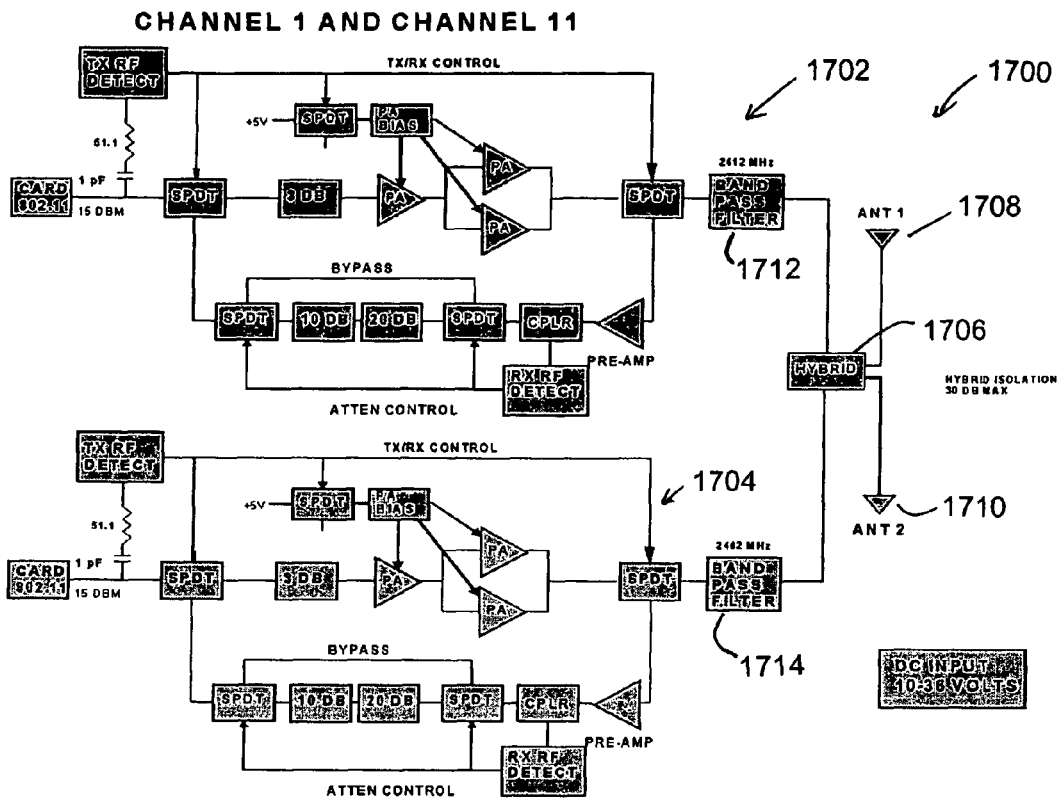
FIG. 16 is a block diagram showing an exemplary embodiment of a RF amplifier, filter, combiner board that is used in some embodiments of the invention.

FIG. 16 is a block schematic diagram of an exemplary embodiment of a circuit 1700 used to implement combined dual amplifier transceivers 305 in device 201 (as shown in FIG. 4). The circuit 1700 provides a wide DC input range for varied operational scenarios. Dual amplifier chains 1702, 1704 are provided that operate on IEEE 802.11b channel 1 and channel 11, respectively. A Hybrid Combiner section

1706 combines the resultant signals onto one transmission line and feeds into antenna ports 1708 and 1710. The circuit 1700 provides ~60 dB isolation between Channel 1 and 11 by employing low-pass filter 1712 and high pass filter 1714 to each amplifier chain. This circuit 1700 provides a simplified design relative to other possible embodiments using a dual amplifier and diplexer.

Circuit 1700 has approximately +28 dBm at the antenna output port. It also provides RF burst-by-burst analysis and attenuation of RX side from an overdrive situation when other radio transmitters are in close proximity. In the event the RF level is greater than +22 dBm, a 30 dB pad is switched into the RX path to eliminate RX overdrive situations.

Figure 17:
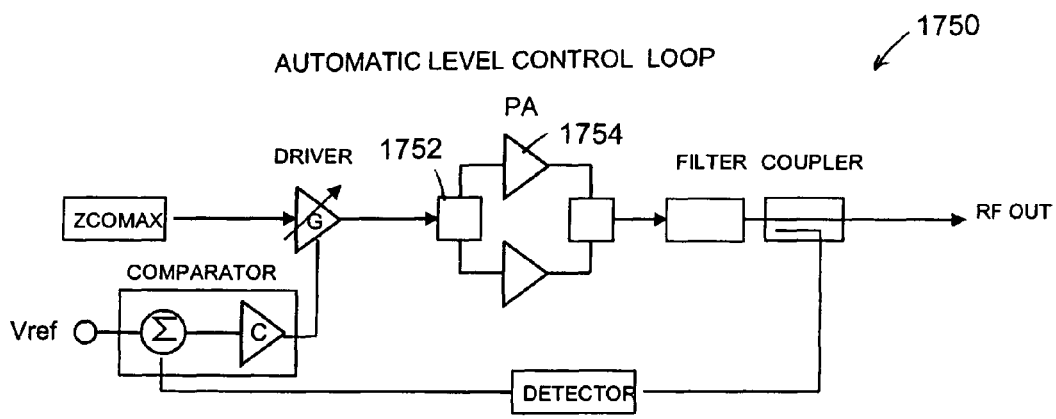
FIG. 17 is a block diagram showing an exemplary embodiment of an automatic level control loop.

Referring to FIG. 17, an automatic level control (ALC) 1750 can be provided for operation with circuit 1700. The ALC 1750 enables the front end 1752 of the amplifiers 1754 to set the input RF to the optimal level to achieve full linear amplifier operation. This allows the device to accommodate a wider range of input radios.

The antenna configuration 1708, 1710 may range from two antennas printed on a circuit board with relatively short feed cables (~10 inches each) to one or more external antennas with varying amounts of gain and directivity. The external antennas may require a length of RF cable between the device 201 and the antenna. The external antenna is typically directional or omnidirectional. The second antenna port 1710 may be terminated in a 50 ohm load if it is not needed. When this second antenna is needed, it is typically a lower gain omnidirectional antenna intended for close network connectivity.

Figure 18:
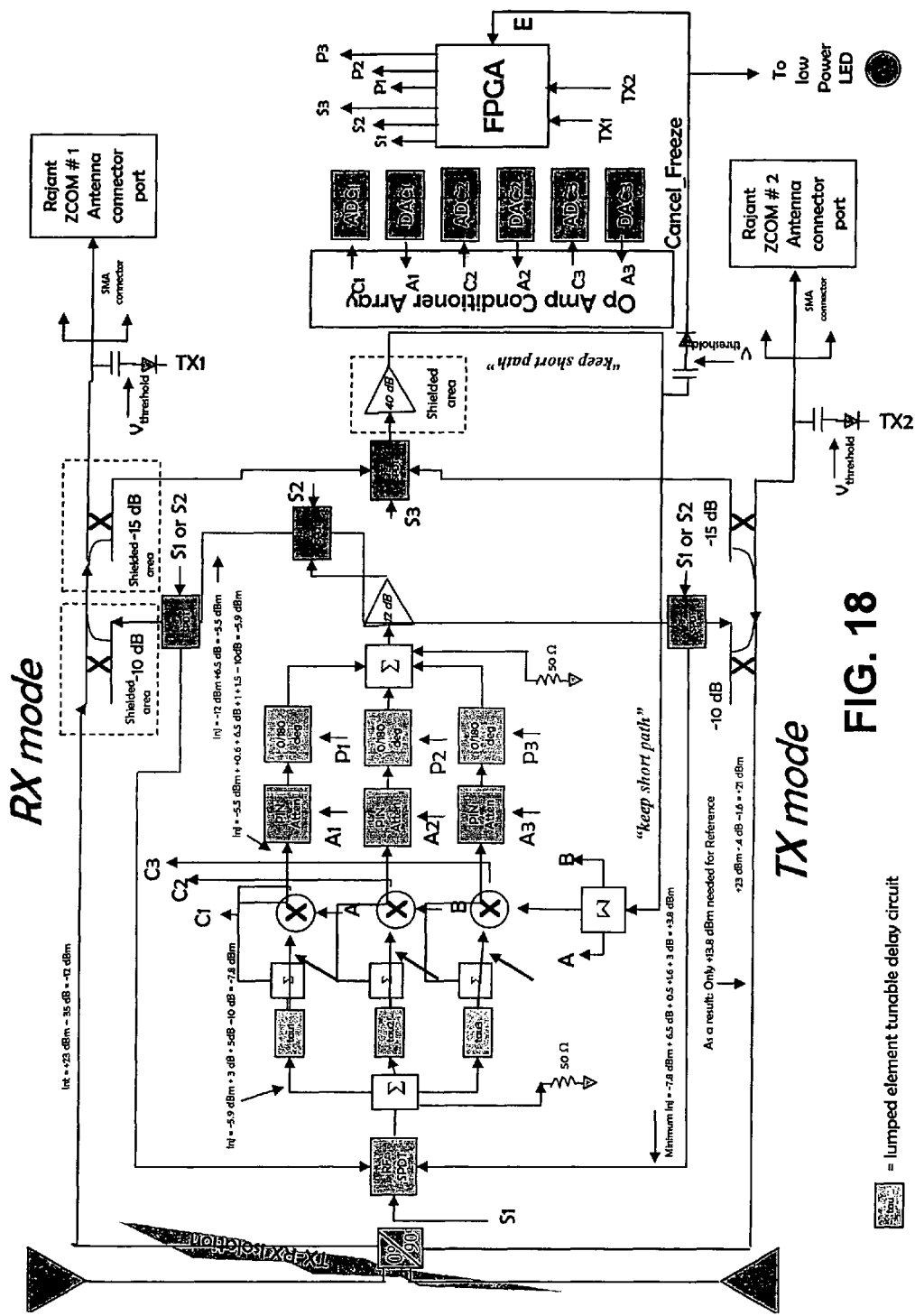
FIG. 18 is a block diagram of an exemplary embodiment of a active canceller circuit board.

FIG. 18 shows an exemplary embodiment of an alternative circuit providing active noise cancellation that can be used to implement transceivers 305 in device 201 (as shown in FIG. 4). In particular, FIG. 18 provides a canceller and combiner circuit that can be used in multi-radio embodiments of the invention. Some degree of signal cancellation is desirable in devices with more than one radio transceiver when one radio in the device is transmitting and one radio is receiving. When both are transmitting or both are receiving, RF switches may be used to turn off power-hungry devices as well as to re-route the reference signal and injection signal used for active cancellation.

The canceller circuit in the embodiment shown has two Radio ports and two Antenna ports. Two antennas ports are desirable to provide adequate omni-directional antenna coverage if an internally mounted antennas is to be provided. The two Radio port channels of the canceller are preferably combined into two separate antenna port paths, each antenna output containing, equally, both RF channels. The outputs are identified as antenna ports and may have, for example, 50 ohms impedance. An example of a combining function is a 90 degree hybrid or a 180 degree hybrid component.

The isolation between radio paths for the radio combiner component is −20 to −25 dB maximum. The RF power level from the transmitter into the radio ports of the circuit are between +23 dBm and +33 dBm. The radio ports for a canceller component of this circuit are cabled connections to another module where the power amplification and receiver Automatic Gain Control functions are located (for both radios). Antenna ports are ports on the canceller which interface to two antenna jacks, although one port may be terminated if desired.

The level of the unwanted RF power out of the canceller's victim radio port due to the second radio's transmit energy is preferably less than or equal to −20 dBm within the interfering channel. Within the victim receiver's channel, the cancelled power is preferably 20 dB lower than that without cancellation. Typically, the power amplifier performance for the transmitter may be −37 dBc when measured within a 10 MHz (detection) bandwidth 25 MHz away from the carrier. Performance may be better than −50 dBc when measured two channels away, or at an offset of 50 MHz.

The first and second gain stages are left alone to preserve the noise figure of the unit and a large pad is placed in-line to achieve the +6 dB desired RX gain figure. The RF Linx amplifier was selected because it also has a detector that switches in a 10 dB attenuator to also assist in overdrive situations. However, this detection and selection does not happen as fast as operation of circuit 1700 of the device 201.

Figure 19:
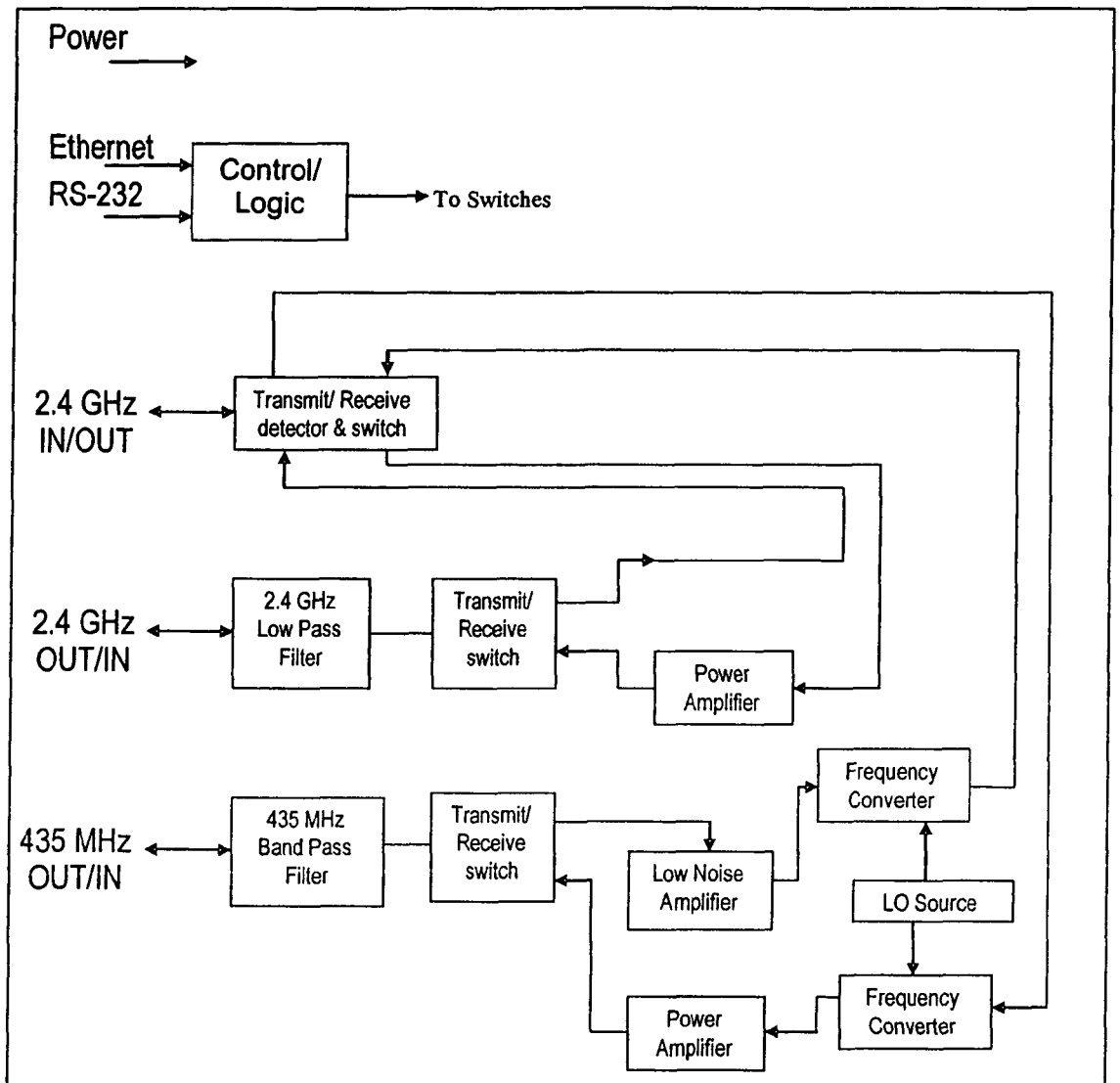
FIG. 19 is a block diagram of an exemplary embodiment of a RF down converter.

Referring to FIG. 19, an exemplary embodiment of a WiFi to UHF down converter 1800 is shown in block schematic form. Converter 1800 may be implemented in the form of a circuit card assembly to provide down conversion to 435 MHz for 802.11b extended range communication links. The down converter unit connects an RF Port to an IEEE 802.11b wireless Ethernet interface. The unit transmits/receives at either 435 MHz or 2.4 GHz on a second or third RF Port respectively. The 2.4 GHz transmission path supplies a typical gain of 5 dB. Given an RF input power of 50 mW-100 mW, the RF output power will be 150 mW-315 mW. The 435 MHz transmission path will provide an output power equal to or greater than 1000 mW. The unit uses an Ethernet interface for receiving management communication for send/receive frequency selection and for selecting the 802.11b channel of operation when down-converting to 435 MHz.

Figure 20:
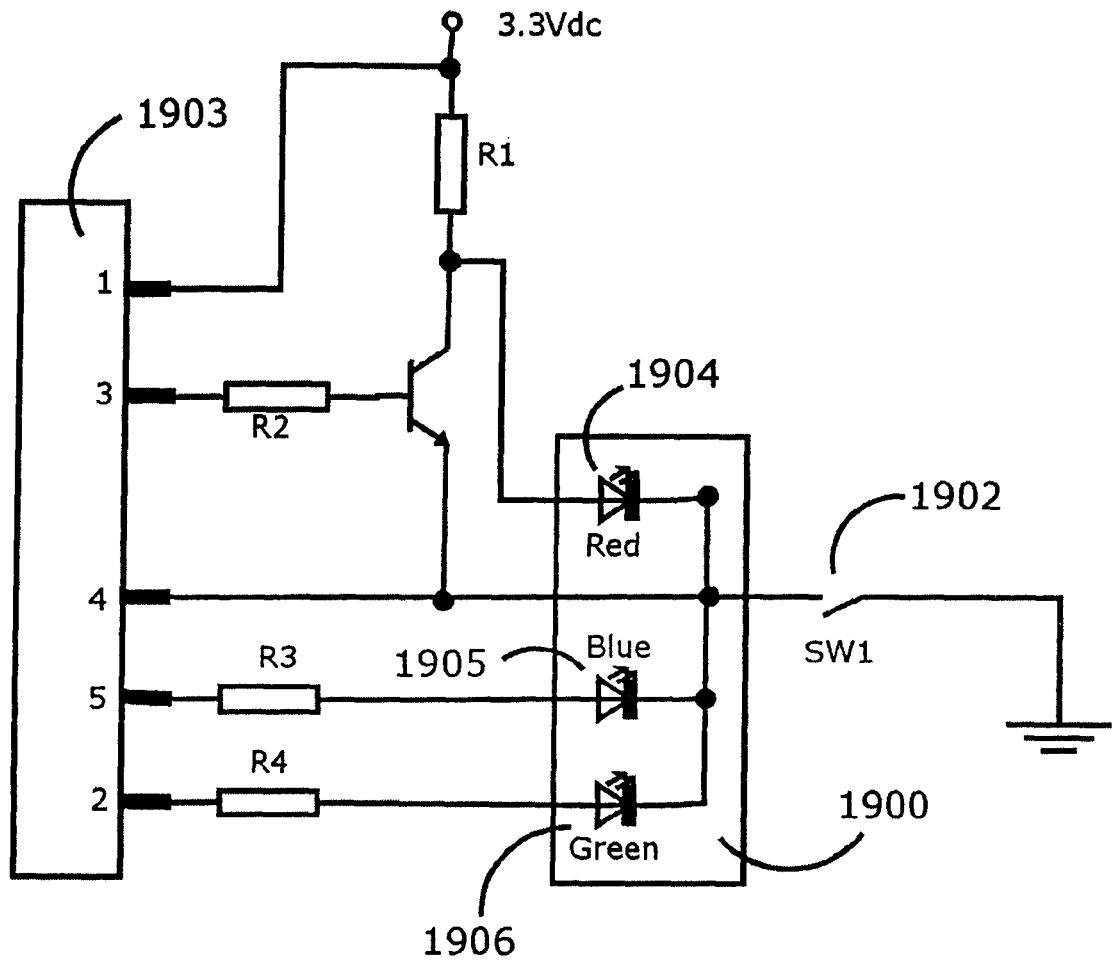
FIG. 20 is a circuit diagram of an exemplary embodiment of a built-in test and evaluation circuit.

FIG. 20 is a circuit diagram of an exemplary embodiment of an indicator circuit useful in some embodiments of the present invention. In an embodiment, the device 201 (shown in FIG. 2) is equipped with a test and indicator circuit that includes an indicator 1900 (for example, a tricolor LED) and momentary-ON action switch 1902. Illumination of the indicator 1900 is controlled at a GPIO port by five GPIO (General Purpose Input/Output) pins on a single board computer (SBC) of the device 201. Pressing the action switch 1902 causes the indicator 1900 to illuminate based on the status provided by the GPIO ports. In an embodiment, the status of device 201's 802.11b radios is indicated by the following LED illumination: Solid Red—not ready (booting); Flashing Red—failed hardware diagnostics or other problems such as invalid security keys; Solid Blue—ready, but no peer connections; Solid Green—at least one peer connection of 11 Mbps; Flashing Green—at least one peer connection, but all are less than 11 Mbps.

Components of the circuit shown in FIG. 20 may include power, ground and GPIO pins controlled by the computer and software (1903); a momentary-on switch for the LED (action switch 1902); a tri-color LED package containing, for example, a RED, BLUE and GREEN LED. In the embodiment shown, when the client device 201 is POWERED but not yet booted: Pin 1 is HIGH & Pin 4 is LOW (since the former is power and the later ground); Pin 3 volts are low-enough (2.4v) to keep the transistor open and therefore driving the RED LED of tricolor LED HIGH and displaying a RED color; Pin 5 & Pin 2 are directly connected to the BLUE LED and GREEN LED of tricolor LED, respectively. The voltage coming out of Pin 5 and Pin 2 is not high enough to drive the LEDs associated those pins, therefore the tricolor LED displays only RED.

When the client device is POWERED and booted: Pin 1 is always HIGH and Pin 4 is always LOW. The LED control software will initially set Pin 3 to HIGH which again keeps the transistor open and therefore drives the RED LED of tricolor LED HIGH. Therefore, the tricolor LED will not change state just yet. Pin 5 & Pin 2 are then set LOW and therefore the RED LED of tricolor LED state doesn't change (still RED).

In response to a MIP interrupt (i.e., new MIP link, deleted MIP link, change in connection speed on a MIP link), the client device software checks the connection table and, if necessary, uses GPIO pins to control LED. If there are no peers, Pin 3 and Pin 5 are set HIGH and other pins are set low. The result is that the BLUE LED is HIGH and the others LOW resulting in BLUE LED tricolor LED being driven. If there are peers and at least one of those peers is a 11 Mbps connection, then Pin 3 and Pin 2 are set HIGH and other pins are set low. The result is that the GREEN LED is HIGH and all the other LEDs LOW resulting in the tricolor LED being solid GREEN. If there are peers, but none has 11 Mbps connection, then the Pin 3 is set HIGH and Pin 2 is switched HIGH to LOW and LOW to HIGH at one second intervals. This causes the GREEN LED to BLINK every second. Of course the color designations for various conditions and the duty cycle of flashing colors are arbitrary and can be set to any desired values.

The purpose of the test and indicator circuit is to provide immediate and ongoing feedback regarding the hardware functionality and mesh connection quality of a particular client device 201. The momentary ON switch is so that energy is not wasted lighting the LED when no one is observing it and so users who require stealth operations do not have a lit LED indicating their location. The information provided by a Solid Red and Flashing Red LED is useful for diagnosing failed hardware when the unit is first turned on. The Solid Blue, Flashing Green and Solid Green signals provide useful information to the person deploying, repositioning, or otherwise adjusting the client device 201 in a way that will affect the mesh infrastructure. Some knowledge of the existing network is helpful for the test and indicator circuit to be as useful as possible.

For example, suppose a new client device 201 is being added to extend a functioning network. The person deploying the new client device walks out to an area with the unit turned on. He presses the test and indicator circuit LED switch and sees Solid Green. That information tells him the client device has at least one mesh infrastructure connection of the highest speed quality. He could decide to deploy the client device at that location, but he may decide to continue trying to extend the network by moving the new client device further away from the other. At some point, if he queries the BITE LED and sees a Flashing Green light, he knows that the client device still has at least one mesh connection to the network, but none are of the highest speed quality. He could then backtrack until he again has a Solid Green light. Of course, this is merely illustrative of one way of employing the inventive concepts disclosed herein. The use of the feedback provided by the test and indicator circuit LED is dependent upon what the user is trying to accomplish and what is known about the existing network infrastructure.

Figure 22:
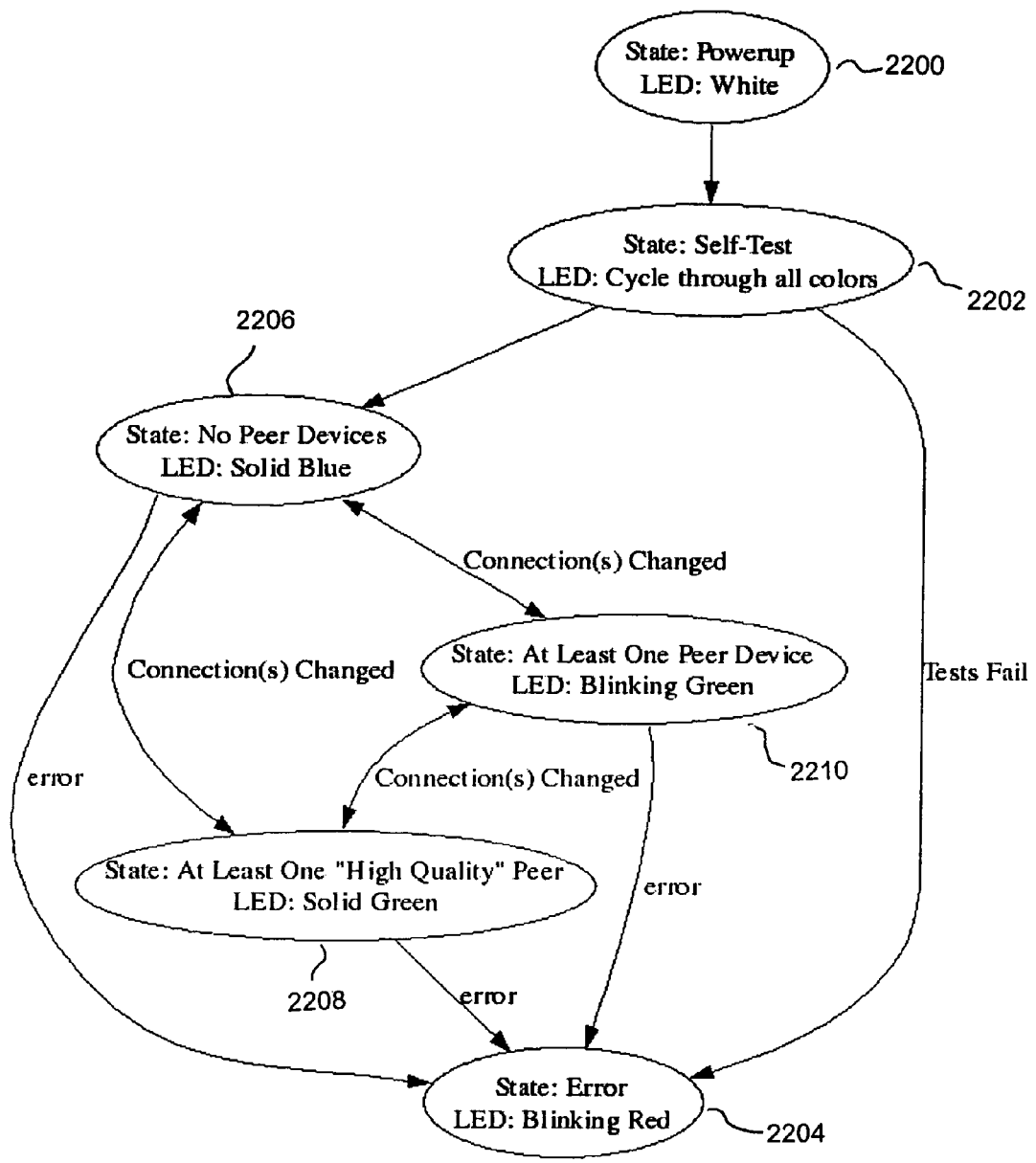
FIG. 22 is a state diagram of an exemplary embodiment of a control algorithm for a status display used in some embodiments of the invention.

FIG. 22 is a state diagram showing one operational embodiment for controlling a tricolor LED indicator 1900. Operation begins at state 2200 wherein the device is powered up. In this state red, green and blue LEDs are turned on to provide a white output. Next, the state shifts to self-test state 2202. During a self-test operation of the device, the LEDs cycle sequentially through the three available colors as the self-test is completed. If the tests fail, the state moves to state 2204, which is an error indicating state. In state 2204, an error indication such as a red blinking LED is provided.

If the tests are passed in state 2202, the system enters state 2206. This state indicates that no peer devices have been connected and is indicated, for example, by a solid blue LED. As the system searches for connections and finds one or more connections, the system will move either to state 2208 or state 2210. The device enters state 2210 when at least one peer device is connected, but no high quality connections are available and is indicated, for example, by a blinking green LED. The device enters state 2208 when at least one high quality peer connection is available. This state is indicated, for example, by a solid green LED.

During operation, the system will cycle between states 2206, 2208 and 2210 depending on the real-time status of the connections available as those connections change. If a device error occurs in any of these states, the system will enter error state 2204. Thus, the indicator LEDs in this embodiment provide a variety of useful status indications using a single simple visual indicator. As noted previously, this indicator can be selectively actuated at those times when the operator wishes to know the device status. Alternatively, the status display can be continuously activated if desired.

When deploying devices in a mobile network, it is useful to be able to quickly determine the presence and/or quality of an individual device's connection to that network. Radio signal strength and signal to noise ratios are commonly used to convey this information in a quantitative manner to an operator; such information is numeric, requiring a versatile display such as a computer monitor or at least a meter, and further requires operator training in order to interpret those numbers. Some software tools, such as those found on laptop computers, make an attempt to qualify this information using simple adjectives such as "Poor", "Good", or "Excellent".

The operational methods disclosed in the embodiment of FIG. 22 are designed to convey qualitative information to its operator using a much simpler interface, such as an LED. In a mesh network, it is usually important to maintain high-speed connections to other mesh devices. One way to qualify this information is as "no connections to other mesh devices" (state 2206), "one or more connections to other mesh devices" (state 2210), and "one or more high-quality connections to other mesh devices" (state 2208).

Various embodiments may use different methods to convey at least the three normal operating states 2206, 2208, and 2210. For example, an LED could be used, using an unlit LED to represent state 2206, a blinking LED to represent state 2210, and a solid LED to represent state 2208. Similarly, this information could be represented using different colored LEDs, as described above, or using a combination of color and blinking. Using such combination of LEDs and/or varying duty cycles allows these other LED behaviors to indicate additional states, such as a power-on or error condition, without any ambiguity.

Figure 21A:
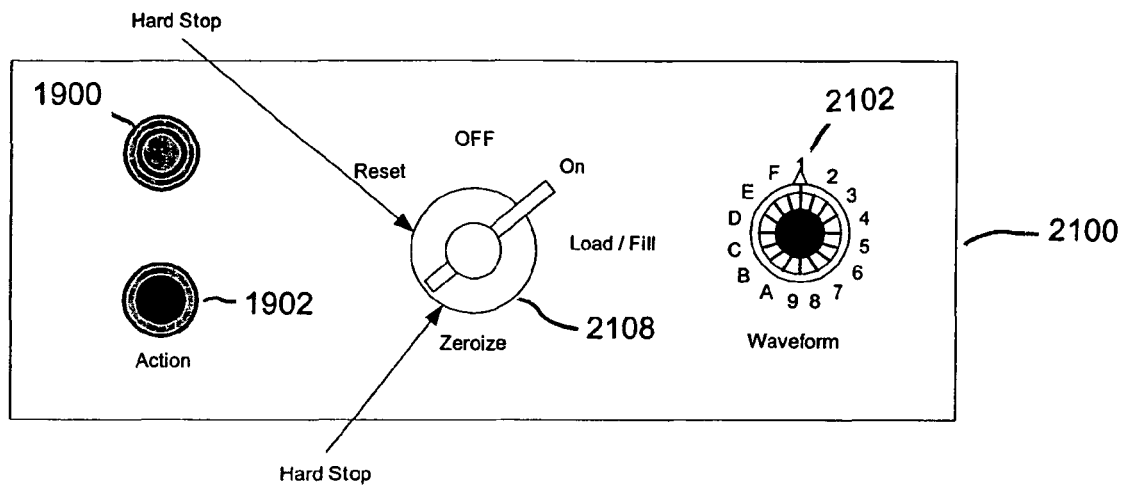
FIGS. 21A and 21B are top views of first and second embodiments of an improved control panel used in some embodiments of the present invention.

FIG. 21A is a top view of an embodiment of a control panel 2100 for the device 201 (shown in FIG. 2). In this embodiment, power switch and operational switch functions are combined in a multiposition switch 2102. The control panel 2100 further includes indicator 1900, action switch 1902, and configuration switch 2108. The indicator 1900 indicates the operational status of the device and its relationship to the remainder of the network. For example, indicator 1900 may incorporate a tricolor LED as previously described herein. Indicator 1900 displays status when the multiposition switch 2102 is in the ON position and action switch 1902 is actuated.

Multiposition switch 2102 controls the operation of device 201. For example, available operational settings may include on, off, reset to defaults, load, and zeroize. In an embodiment, a hard stop is provided after RESET in the counterclockwise direction and a hard stop after ZEROIZE when rotating clockwise. An open position may be provided between load/fill and zeroize positions to reduce the likelihood of accidental actuation of the zeroize function.

Configuration switch 2108 may be, for example, a 10 to 16 position BCD switch that configures the device into one of a plurality of available defined configurations. Dual configuration switches 2108 may also be provided, resulting in 99 to 254 possible configuration settings. Each available configuration setting may be associated with a defined value for one or more of the following configurable variables: SSID, frequency band operation, encryption keys, channel usage, handshaking security keys, modes of operation for multimode radio cards, Quality of Service (QOS) priorities, ACLs, operation of status display devices, or any other configurable quantity in the system. Each preset configuration may involve a single variable or may define settings for multiple variables. These preset configurations may be selected manually using one or more configuration switches 2108, or may be selected remotely through an administrative command received via the network. For example, configuration may be administered remotely using a proprietary software package.

Preset configurations may be loaded from the network or through a physical interface by an authorized user. In these embodiments, there is a useful advantage because devices can be deployed more quickly if they are preconfigured. A wide range of attributes can be adjusted to affect security, range, compatibility and other performance criteria.

Action switch 1902 performs different functions depending on the position of multiposition switch 2102. When multiposition switch 2102 is in the RESET position, the action switch 1902 resets the device, e.g. returns the device to factory default conditions. When multiposition switch 2102 is in the ON position, the action switch 1902 activates the indicator 1900 to show device status. If the configuration switch 2108 has been adjusted, activating the action switch 1902 while multiposition switch 2102 is in the ON position will also load a new configuration associated with the current position of the configuration switch 2108. When the multiposition switch 2102 is in LOAD/FILL position, action switch 1902 initiates a firmware update or key fill operation. When multiposition switch 2102 is in ZEROIZE position, pressing and holding action switch 1902 for a predetermined period of time will erase the device's memory, configuration, and encryption settings.

Figure 21B:
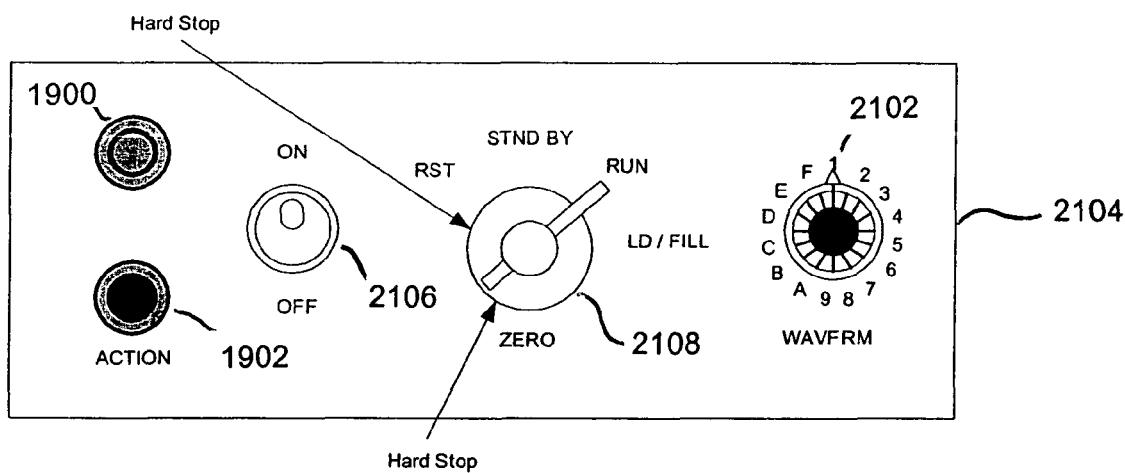

FIG. 21B shows another embodiment of control mechanisms for the device, in the form of control panel 2104. Control panel 2104 is similar in layout to control panel 2100 shown in FIG. 21A. However, control panel 2104 has a separate power switch 2106. Rotary switches may have current limitations that would limit the size and power of the device if the rotary switch is used to source operating current for the entire device. Therefore, the provision of a separate power switch makes it possible for the device to draw a higher current level limited only by the capacity of the separate power switch 2106, which may be any appropriate switch, switching circuit, or relay device.

The software or firmware that resides on the device, including the operating system, routing protocols, encryption and handshaking keys, and configuration parameters is preferably secured in order to prevent the loading of software intended to disrupt communications, gain access to secure information, or otherwise compromise the network.

It is useful in a mesh network to ensure that nodes do not run unauthorized software. Such nodes would have the ability to authenticate with other nodes but would present a significant risk for data security; they could act as rogue agents by injecting, dropping, modifying, storing, and/or forwarding data packets in ways not specified by the meshing protocol and not expected by users, disrupting the system. One manner in which unauthorized software could be placed on a node is through the network itself. A software vulnerability in a program running on a node could be remotely exploited, providing an attacker with the ability to store, replace, or destroy data on a device.

In preferred embodiments, the file system on each node is accessed in a read-only manner through software, preventing most attacks. However, it is still conceivable that an attacker could circumvent this and access a node's file system in a read-write mode. In an embodiment, a second layer of security in the form of hardware-enforced read-only access to data is provided. With this layer, the write-enable pin of the storage chip(s) themselves are connected to a physical switch on the outside of the node device. This switch is additionally connected to the node in such a manner that its state can be read by the software running on the node. When the switch is turned to a position that hardware-enables writing to the node's storage chip(s), all of the node's network interfaces are disabled. In this embodiment, physical access to a node is required in order to modify its program memory, and data cannot be written to the node's storage chip(s) while the node is capable of communication.

Figure 23:
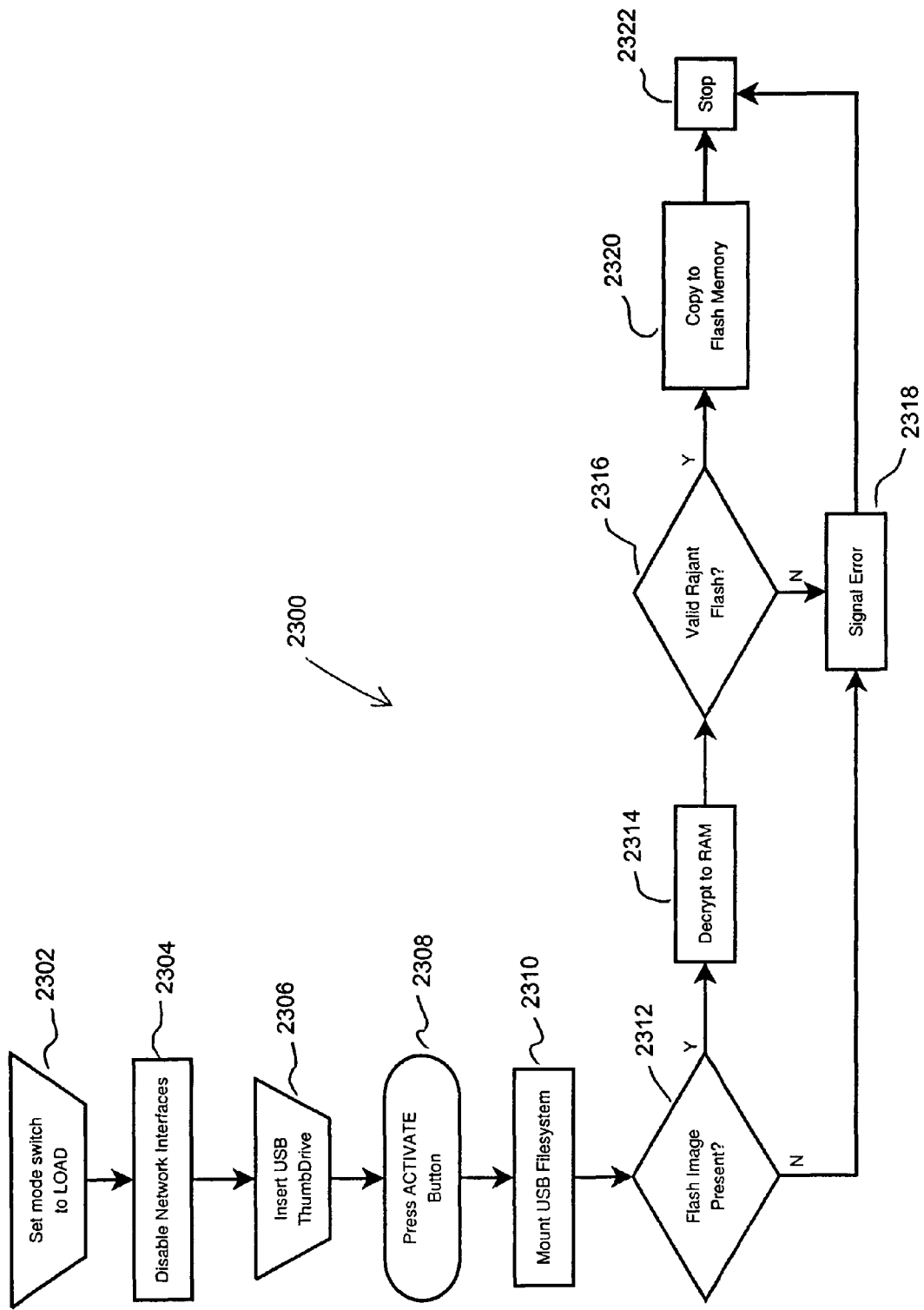
FIG. 23 is a flow chart showing a process for secure updating of a memory in the device.

Referring to FIG. 23, a process 2300 for loading new software onto a node is shown in flow chart form. The process 2300 begins with step 2302 wherein a mode switch is set to a loading mode. Then, in step 2304, network interfaces are disabled. The mode switch is preferably set to a position that simultaneously allows write access and disables communication. For example, multiposition switch 2108 (shown in FIGS. 21A and 21B) can be set to a load/fill position, which permits write access to storage chips in the device and disables the operation of all network interface ports, thus performing steps 2302 and 2304.

Next, in step 2306, a user provides an external data source such as a USB drive, and in step 2308 presses the action button to start the loading process. The node checks its external data interfaces (e.g., external USB storage) in step 2310 for one or more specially-formatted data files containing the new software. In step 2312, if a proper flash image is present, control passes to step 2314. If no flash image is present, control passes to step 2318 and an error signal is generated before the process ends at step 2322.

When a flash image is present, in step 2314 the flash image is decrypted to RAM in the device. Then, in step 2316, the flash image is validated. Preferably, the data files are cryptographically signed by the software developer using public key cryptography and are verified against a public key stored within the node during its manufacture. If the cryptographic signature of the new software is valid, the node is assured that the software is authorized. If the software is authorized, control passes to step 2320 and the new software is loaded onto the node. If the software is not authorized, the process continues with step 2318 and the generation of an error signal.

Thus, a secure method of loading new software or firmware has been disclosed. In an embodiment, the method comprises requiring physical access, disabling communications during loading operations, and using an alternate communications channel to provide the software, such as a USB or other physical connection, rather than a network connection.

One method of attack is to join the mesh infrastructure as a peer and operate as a "rogue" node. To prevent this, authentication is desirable to insure that only properly credentialed nodes are accepted into the network. If a node does not impose limitations with regard to accepting connections from other nodes, the entire mesh's security could be compromised by the introduction of a node under the control of an attacker. Thus, in an embodiment, only those devices that are authorized by a network administrator are permitted to participate in the mesh (that is, forward data on behalf of other nodes).

In an exemplary embodiment, a two-stage connection process is provided. Connections may be freely established between nodes in the first stage. Each node, however, will neither forward data to nor accept data from the other node until a mutual authentication and authorization step takes place.

Figure 24:
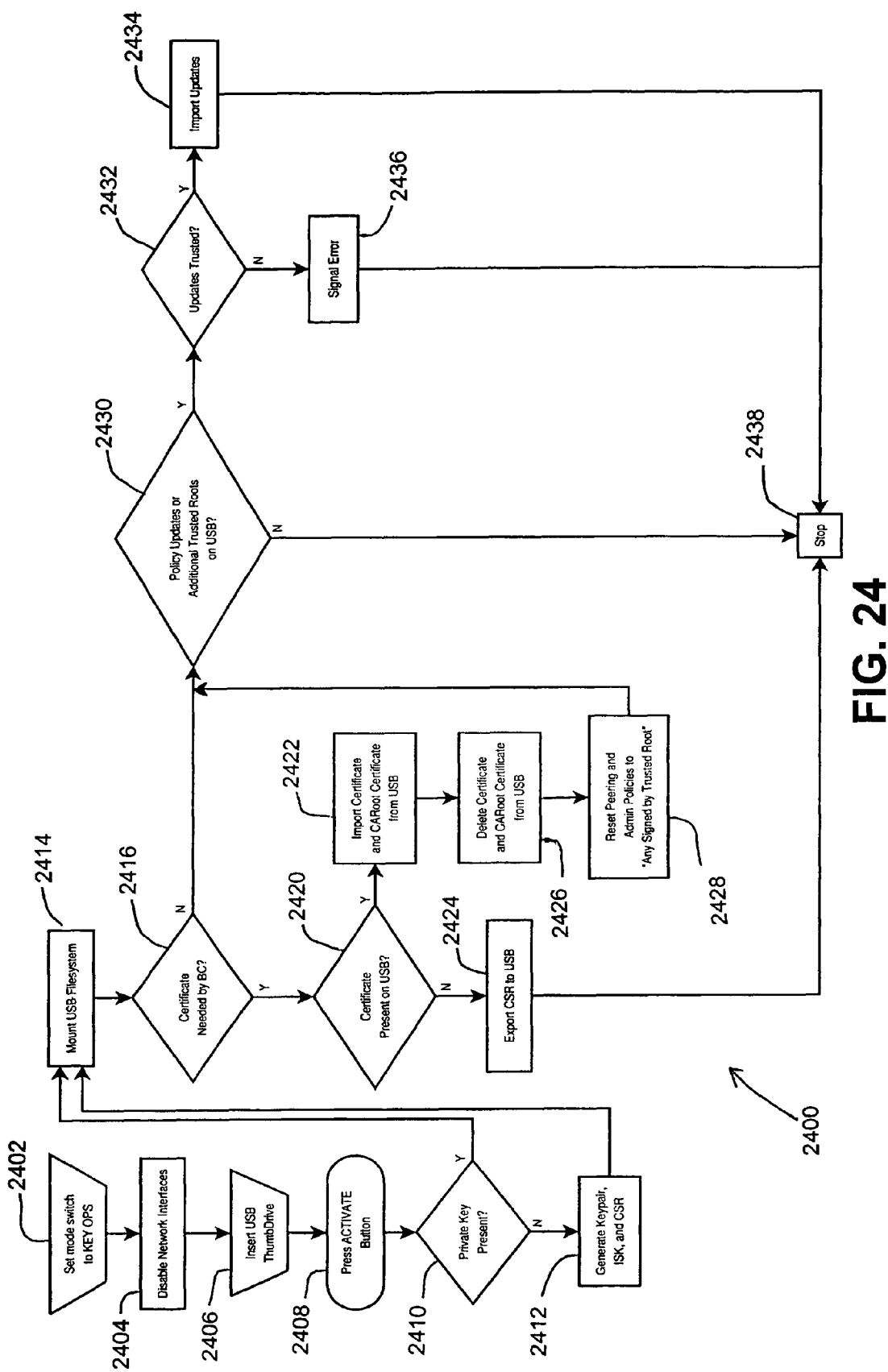
FIG. 24 is a flow chart showing another embodiment of a process for securing access to a file system in the device.
Figure 25:
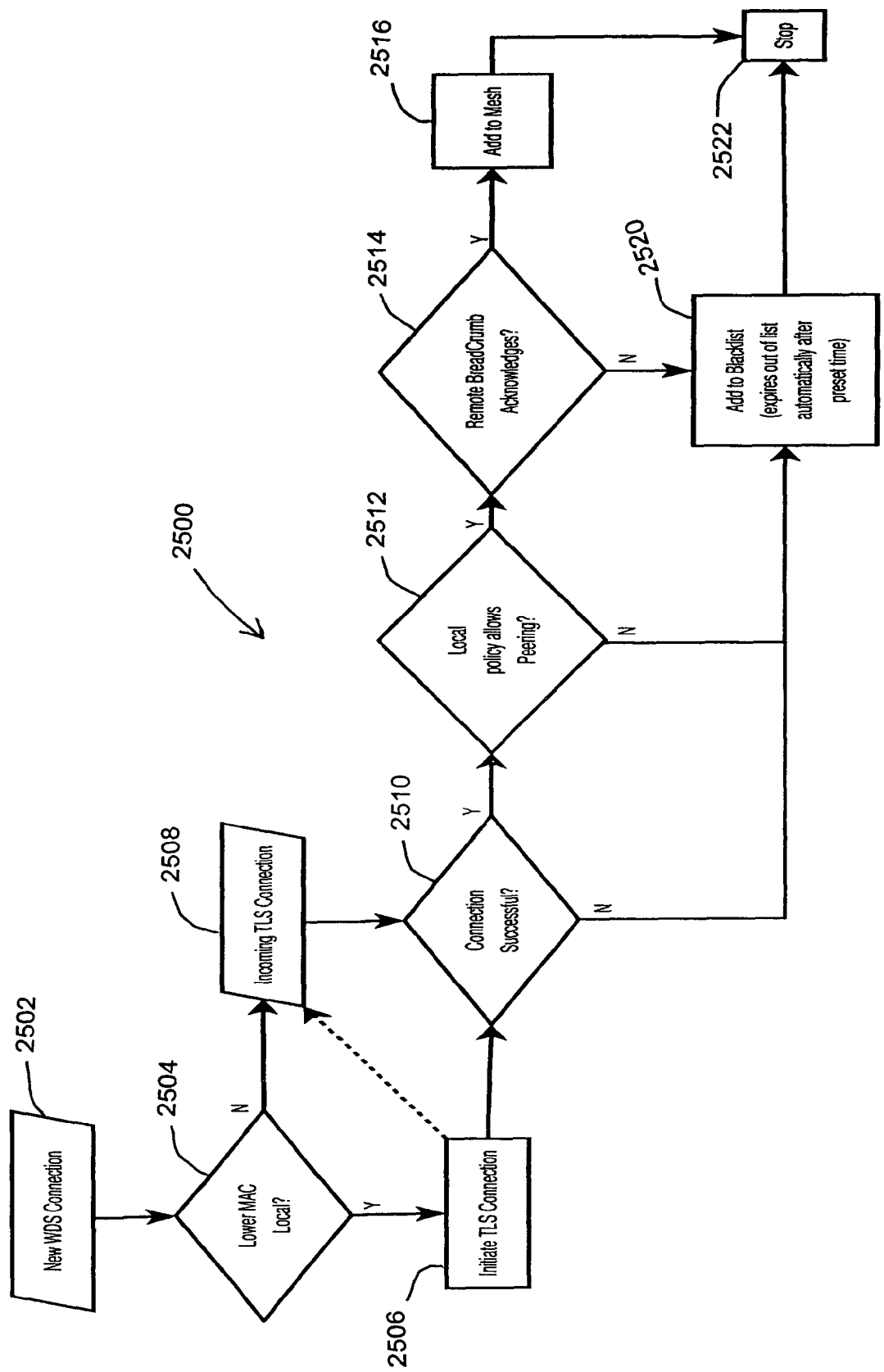
FIG. 25 is a flow chart showing an exemplary embodiment of a process for secure authentication of devices seeking to join the network.

FIGS. 24 and 25 are flowcharts showing exemplary embodiments of methods that can be used to authenticate and secure the mesh network described herein. In an embodiment, public key cryptography may be used to provide authentication services. Before it can communicate with any other nodes, a node must first establish a cryptographic identity. Referring now to FIG. 24, an example process 2400 is shown for a device to establish a cryptographic identity. This is accomplished by generating a key pair following common public/private key generation methods. The node's public key is then exported from the device where it can be cryptographically signed ("certified") by an external administrator, and is then re-imported into the node. If two nodes are configured to trust the same certifying authority, they can establish one another's identity with a reasonable degree of assurance.

Process 2400 in FIG. 24 begins with step 2402, in which the mode switch for the device is set for KEY operation. In step 2404, the device's network interfaces are disabled so that no data can be transmitted over the network for the duration of process 2400. In step 2406, an external data source is provided, for example, a USB drive. Then, in step 2408, the action switch is actuated to start the key loading process. In step 2410, the system determines whether a private key is already present. If not, in step 2412 a key pair, Inner Session Key (ISK) and Certificate Signing Request (CSR) are generated and the process then continues at step 2414. If so, step 2412 is omitted and the process continues at step 2414 where the USB file system is mounted. Then, in step 2416, the system determines whether a certificate is needed. If not, the process continues at step 2430. If a certificate is needed, in step 2420, the system determines whether the certificate is present on the external data device (e.g. USB drive). If so, in step 2422, the certificate and Client Authentication Root (CA-Root) certificate are imported from the USB. Then, in step 2426, these certificates are deleted from the USB, and in step 2428 peering and administrative policies for the device are reset to "Any Signed by Trusted Root." The process then continues with step 2430.

If in step 2420 the certificate is not present, the process continues at step 2424 and the CSR is exported to the USB device, after which the process concludes at step 2438.

In step 2430, the system determines whether there are any policy updates or additional trusted root designations on the USB device. If not, process 2400 concludes at step 2438. If so, in step 2432 the system determines whether the updates can be trusted. If so, the updates are imported in step 2434 and the process is completed at step 2438. If not, an error is signaled in step 2436 and the process ends at step 2438.

Referring now to FIG. 25, process 2500 allows new nodes appearing on the network to be authenticated and join the network. In step 2502, a new MIP connection is created as a node attempts to join the network. In step 2504, the device determines whether it should act as a "client" or "server" in establishing a secure connection, which may be, for example, either a Secure Sockets Layer (SSL) connection or a Transport Layer Security (TLS) connection. In the exemplary embodiment shown in FIG. 25, a node uses the physical interface address (MAC) of the potential peer node to compute an IPv4 or IPv6 address based upon that address. This IPv4 or IPv6 address is then used to establish a connection to the other node. Such connections are generally made in a "client-server" fashion; the MAC addresses will be used by the two nodes in order to determine which role a node will serve in the connection (for example, the node with the alphanumerically lower address may be designated as the client, and the node with the alphanumerically higher address is then designated as the server). If the local device has the lower MAC address, it will act as the client and initiate (for example) a Transport Layer Security (TLS) connection in step 2506. If not, the other device should initiate a TLS connection and the local device waits for an incoming TLS connection in step 2508.

Following step 2506 or step 2508, as appropriate, the system determines whether the TLS connection has been successfully established in step 2510. If so, the process continues with step 2512. In step 2512, the system determines whether the local policy allows peering. This authorization step requires each node to check a local set of rules specifying which nodes it may or may not communicate with. This rule set may simply specify that any authenticated node may connect, may individually specify nodes as being permitted or not permitted to connect, or some combination of these. If connection with the new node is permitted, the process continues at step 2514 where the device determines whether the remote device is providing a correct encrypted response. If so, the process continues at step 2516 where the new node is added to the mesh, and the process then concludes at step 2522. If each node allows the other to connect in step 2516, a secure communication channel is established and recognized by each node. Upon recognition of this established channel, each node may enable the forwarding of data packets to and from the other node, thus forming a "mesh connection" (stage 2).

If anything goes wrong during the authentication process described above, e.g. the connection is unsuccessful in step 2510, local policy does not allow peering in step 2512, or the remote device does not properly authenticate itself in step 2514, the process moves immediately to step 2520, where the remote device is added to a blacklist and not permitted to join the mesh, before the process concludes at step 2522. Any blacklist entry may be programmed to expire after a defined time period, if desired.

Thus, when a stage 1 (unauthenticated) connection is established between two nodes, the nodes communicate directly with one another using certified key pairs. If authentication is successful, the authorization step is taken. If unsuccessful, the connection between the two nodes is destroyed and the node that failed to authenticate is blacklisted.

Preferably, the secure inter-node connection thus established is used to transmit additional information, such as a list of each node's interface addresses, in order to facilitate further communications and support additional meshing features such as the multiplexing of connections.

Another embodiment of the invention is directed to a method for addressing each transceiver and Ethernet port on a network node device separately. Therefore, each wireless transceiver and Ethernet port can be configured to connect as a gateway or bridge to different networks and sub-networks by providing port specific Network Address Translation (NAT), ingress and egress port forwarding, point-to-point Virtual Private Networking (VPN), SSH client, QOS packet filtering, encryption and authentication, access control lists, and other network services.

Another embodiment of the invention is directed to a method for implementing computer-modeling for a wireless mobile ad-hoc network. The computer-modeling includes determining the state of the wireless network connections between all network node devices and their associated wireless client devices, and displaying a graphical topology of the entire network. Each network device displayed can be selected in real-time for obtaining detailed state, configuration and performance information regarding the network node device selected as well as any connections it has to other network node devices and client devices. The network topology and detailed state information can be simultaneously displayed on a common display.

The graphical topology can include the use of a predetermined color scheme that provides additional information related to the network node devices or channels displayed. By way of example, the detailed identification information includes at least a MAC address, any associated network node devices, the signal quality, the noise level, the channel quality and the data rate.

Another embodiment of the present invention is directed to a system for data communication in a wireless network that includes an administrative device in communication with the network and a plurality of network node devices. The administrative device is adapted to communicate with the network via a wired connection or wireless connection, which by way of example includes compatibility with at least the IEEE 802.11b, 802.11a, 802.11g or 802.11n standards. The administrative device can be a PC or the like that is capable of graphically illustrating a topology of the wireless network as well as monitoring and controlling network node devices.

The administrative device is capable of establishing a connection to each network node device for the purpose of communicating certain settings which, by way of example, include at least radio and channel characteristics, wired and wireless bridge and gateway functionality, security parameters, and graphical display identification characteristics. Additionally, the administrative device is capable of establishing a connection to all or a subset of all network node devices for the purpose of communicating certain settings which, by way of example, include at least access control list, shared encryption parameters, network identifiers. The administrative device is also capable of acting as a proxy for other administrative devices on the network by providing pass through management capabilities to those administrative devices through communication protocols which, by way of example, include Simple Network Management Protocol (SNMP), other standards based and proprietary management protocols.

Another embodiment of the present invention is directed to a network node device that includes at least one transceiver, a processor module, a memory module and control software that are logically connected. The control software causes the processor module to configure the transceiver for establishing and maintaining a communications link with at least one other network node device by scanning and selecting a channel using predetermined rules. The memory module stores data that is sent to and received by the other network node devices and the administrative devices.

Each network node device may further include at least a second transceiver that is configured by the control software to select a different channel than the first transceiver. Each network node device transceiver can be configured to connect to other network node devices, provide access point services to wireless client devices, connect to another access point, client device or wireless bridge that is part of another network or sub-network, or some combination of these services. Connection to other network node devices is established by providing at least $$\lceil \frac{n}{2} + 1 \rceil$$

transceivers in each network node device, where n is equal to the number of channels in the pool of channels to be used.

At least one or more transceivers in the network node device are used to connect to other network node devices having a transceiver configured for the same channel. At least one or more transceivers in the network node device may also be configured as an access point for connection to a wireless client device. At least one or more transceivers in a network node device may also be configured to connect to an access point or wireless bridge that is part of another network or sub-network. By way of example, a network node device may include three transceivers. Through scanning and analysis the network node device may determine that transceiver A should be set to channel 1 and is configured to provide connection service to other network node devices as well as access point service to wireless client devices which can include wireless PCs, wireless IP video cameras, wireless Voice over Internet Protocol (VoIP) phones, and other devices. Scanning and analysis might also determine that transceiver B should be set to channel 8 and only configured to provide connection service to other network node devices, while transceiver C should be set to channel 11 and configured to provide gateway services to an access point on a different wireless network.

Additionally, the network node device may also be configured with at least one Ethernet port for connecting to wired client devices or wired networks. Each Ethernet port may be configured as a switch, bridge, or NAT gateway to another network or sub-network. Each network node device can receive power either from an external AC source via an AC to DC power adapter or from a rechargeable or one-time-use battery integrated with or external to the device itself. The network node device could further include a position-identifying module connected to the processor for transmitting location information to a management application.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. Thus, the breadth and scope of the present invention should not be limited by any of the above-described exemplary embodiments, but should be defined only in accordance with the following claims and their equivalents. The terms or expressions herein should not be interpreted to exclude any equivalents of features shown and described or portions thereof.

What is claimed is:

1. A method of communicating in an ad-hoc network, comprising:
 providing at least one portable network device including a transceiver and a processor that implements a data communication protocol to communicate communications data to other network devices through one or more network ports connected to the other network devices in the ad-hoc network, the communications data being divided into data packets, and each data packet being encoded with a protocol header that includes the packet's source address and cost information;

detecting an incoming data packet received by the portable network device;

identifying an ingress port on which the data packet was received;

reading the packet's source address and cost information;

comparing the packet's source address, cost information, and ingress port with source address, cost information, and ingress port stored in a bridge table in the portable network device to determine retransmission parameters for each data packet;

determining based on the retransmission parameters whether the data packet should be dropped or retransmitted through one or more of the network ports of the portable network device and processing the data packet accordingly; and determining whether lower cost routing is available for packets to the source based on the results of said comparing step and, if so, storing new cost and routing information associated with the lower cost routing in the bridge table.

2. The method of claim 1, further comprising a step of determining whether the bridge table has an entry corresponding to the packet's source address and, if not, creating a bridge table entry using the cost information provided in the data packet.

3. The method of claim 1, further comprising a step of determining whether the bridge table has an entry corresponding to a packet destination and, if not, creating a bridge table entry for the packet destination.

4. The method of claim 1, further comprising the steps of detecting an incoming data packet that has not been encoded with the packet's source address and cost information and encoding the data packet with the packet's source address and cost information before retransmitting the data packet to a wireless device on the network.

5. The method of claim 1, wherein the data packet includes a protocol identifier indicating that the data packet includes a header to facilitate transmission in the ad-hoc network.

6. The method of claim 5, further comprising the steps of changing the protocol identifier, removing the source address and cost information from the data packet and retransmitting the data packet via a non-ad-hoc network connection.

7. The method of claim 5, wherein the step of reading the packet's source address and cost information includes reading at least one of a destination address, source address, source sequence number (SSN), mesh protocol identifier, cost, and one or more mesh protocol flags.

8. The method of claim 7, wherein the mesh protocol flags comprise lower-order bits including at least one of an introductory flag, a discovery flag and, an undeliverable flag.

9. The method of claim 8, wherein the mesh protocol flags include the undeliverable flag when the destination address is not at least one of broadcast, multicast, or local, and the data packet is sent back to the source via the reception port when the destination address is not at least one of broadcast, multicast, or local.

10. The method of claim 1, wherein comparing header information with the bridge table includes comparing source information in the header with source information in the bridge table.

11. The method of claim 1, wherein comparing header information with the bridge table includes comparing destination information in the header with destination information in the bridge table.

12. The method of claim 1, wherein comparing header information with the bridge table includes comparing a timestamp associated with the data packet with a current timestamp.

13. An ad-hoc mesh network, comprising:
a portable network device that includes:
at least one wireless transceiver and a processor that performs stored program steps to operate the portable mesh network device as a node in the ad-hoc mesh network by implementing a data communication protocol that communicates communications data to other mesh network devices in the ad-hoc mesh network through one or more mesh network ports, the communications data being divided into data packets, and each data packet being encoded with a protocol header that includes the packet's source address and cost information; and
a bridge table that identifies known mesh network devices and cost information for data transmissions to the known mesh network devices,
the processor being configured to detect an incoming data packet received by the portable network device,
identify an ingress port on which the data packet was received,
read the packet's source address and cost information,
compare the packet's source address, cost information, and ingress port with source address, cost information, and ingress port stored in the bridge table to determine retransmission parameters for each data packet,
determine based on the retransmission parameters whether the data packet should be dropped or retransmitted through one or more of the network ports of the portable network device and process the data packet accordingly; and
determine whether lower cost routing is available for packets to the source based on the results of said comparison and, if so, storing new cost and routing information associated with the lower cost routing in the bridge table.

14. The ad-hoc mesh network of claim 13, wherein the processor is further configured to determine whether the bridge table has an entry corresponding to the packet's source address and, if not, to create a bridge table entry using the cost information provided in the data packet.

15. The ad-hoc mesh network of claim 13, wherein the processor is further configured to determine whether the bridge table has an entry corresponding to a packet destination and, if not, to create a bridge table entry for the packet destination.

16. The ad-hoc mesh network of claim 13, wherein the processor is further configured to determine whether the data packet has been encoded with the packet's source address and cost information and, if not, to encode the data packet with the packet's source address and cost information before retransmitting the data packet to a wireless device on the ad-hoc mesh network.

17. The ad-hoc mesh network of claim 16, wherein the processor is further configured to change the protocol identifier, to remove the source address and cost information from the data packet, and to retransmit the data packet via a non-ad-hoc network connection.

18. The ad-hoc mesh network of claim 16, wherein reading the packet's source address and cost information includes reading at least a destination address, source address, source sequence number (SSN), mesh protocol identifier, cost, and one or more mesh protocol flags.

19. The ad-hoc mesh network of claim 18, wherein the mesh protocol flags comprise lower-order bits including at least one of an introductory flag, a discovery flag and, an undeliverable flag.

20. The ad-hoc mesh network of claim 19, wherein the mesh protocol flags include the undeliverable flag when the destination address is not at least one of broadcast, multicast, or local, and the data packet is sent back to the source via a reception port on which the data packet was received when the destination address is not at least one of broadcast, multicast, or local.

21. The ad-hoc mesh network of claim 13, wherein the protocol implements a distinctive ethertype identifier indicating that the data packet includes data to facilitate transmission in the ad-hoc mesh network.

22. An ad-hoc mesh network, comprising:
a portable network device that includes:
at least one wireless transceiver and a processor that performs stored program steps to operate the portable mesh network device as a node in the ad-hoc mesh network by implementing a data communication protocol that communicates communications data to other mesh network devices in the ad-hoc mesh network through one or more mesh network ports, the communications data being divided into data packets, and each data packet being encoded with a protocol header that includes packet source and cost information; and
a bridge table that identifies known mesh network devices and cost information for data transmissions to the known mesh network devices;
wherein the processor is configured to compare the packet source and cost information in the data packet with corresponding information in the bridge table to determine whether lower cost routing is available for transmitting data packets to the source and, if so, to store new cost and routing information associated with the lower cost routing in the bridge table;
wherein implementation of the data communication protocol causes each mesh network device in the ad-hoc mesh network to determine retransmission parameters for each data packet, the retransmission parameters establishing whether the data packet should be dropped or retransmitted to other mesh network devices in the ad-hoc mesh network and through which mesh network port the data packet should be retransmitted;
wherein the protocol header further includes destination information;
wherein the bridge table further identifies at least one mesh network device with a source address that corresponds to the packet source information and at least one mesh network device with a destination address that corresponds to the packet destination information;
wherein each mesh network device in the ad-hoc mesh network is configured to compare the packet destination information with corresponding information in the bridge table in that mesh network device to determine if the destination address is at least one of broadcast, multicast, or local and to update the retransmission parameters so that the destination information identifies a data packet as undeliverable when the destination address is not at least one of broadcast, multicast, or local;
wherein the processor of the portable network device sends the data packet back to the at least one mesh network device with the source address that corresponds to the packet source information via a mesh network port through which the data packet was received when the destination information identifies that data packet as undeliverable; and
wherein a processor at the at least one mesh network device with the source address that corresponds to the packet source information that updates its bridge table to remove the destination address when the destination information identifies that data packet as undeliverable.

23. The ad-hoc mesh network of claim 22, wherein the processor is further configured to determine whether the bridge table has an entry corresponding to the packet's source address and, if not, to create a bridge table entry using the cost information provided in the data packet.

24. The ad-hoc mesh network of claim 22, wherein the processor is further configured to determine whether the bridge table has an entry corresponding to a packet destination and, if not, to create a bridge table entry for the packet destination.

25. The ad-hoc mesh network of claim 22, wherein the processor is further configured to determine whether the data packet has been encoded with the packet's source address and cost information and, if not, to encode the data packet with the packet's source address and cost information before retransmitting the data packet to a wireless device on the ad-hoc mesh network.

26. The ad-hoc mesh network of claim 25, wherein the processor is further configured to change the protocol identifier, to remove the source address and cost information from the data packet, and to retransmit the data packet via a non-ad-hoc network connection.

27. The ad-hoc mesh network of claim 25, wherein reading the packet's source address and cost information includes reading at least a destination address, source address, source sequence number (SSN), mesh protocol identifier, cost, and one or more mesh protocol flags.

28. The ad-hoc mesh network of claim 27, wherein the mesh protocol flags comprise lower-order bits including at least one of an introductory flag, a discovery flag and, an undeliverable flag.

29. The ad-hoc mesh network of claim 28, wherein the mesh protocol flags include the undeliverable flag when the destination address is not at least one of broadcast, multicast, or local, and the data packet is sent back to the source via a reception port on which the data packet was received when the destination address is not at least one of broadcast, multicast, or local.

30. The ad-hoc mesh network of claim 22, wherein the protocol implements a distinctive ethertype identifier indicating that the data packet includes data to facilitate transmission in the ad-hoc mesh network.

31. The ad-hoc mesh network of claim 22, wherein the processor of the portable network device is configured such that potential flood packets are carried as unicast packets towards a densest part of the mesh network.

32. The ad-hoc mesh network of claim 22, wherein the processor of the portable network device is configured to use source sequence numbers in the packets for loop prevention.

* * * * *